(12) United States Patent
Cunningham et al.

(10) Patent No.: US 7,716,781 B2
(45) Date of Patent: May 18, 2010

(54) SUCTION MOTOR FOR VACUUM CLEANER

(75) Inventors: J. Vern Cunningham, Aurora (CA); Timothy Poupore, Toronto (CA); Charles D. Syverson, Mankato, MN (US)

(73) Assignee: Cube Investments Limited, Aurora (CA)

( * ) Notice: Subject to any disclaimer, the term of this patent is extended or adjusted under 35 U.S.C. 154(b) by 1531 days.

(21) Appl. No.: 10/507,319

(22) PCT Filed: Mar. 12, 2003

(86) PCT No.: PCT/CA03/00382

§ 371 (c)(1),
(2), (4) Date: Sep. 10, 2004

(87) PCT Pub. No.: WO03/075733

PCT Pub. Date: Sep. 18, 2003

(65) Prior Publication Data

US 2005/0166351 A1    Aug. 4, 2005

Related U.S. Application Data

(60) Provisional application No. 60/363,351, filed on Mar. 12, 2002, now abandoned.

(51) Int. Cl.
  B60S 1/54    (2006.01)
  B60S 1/64    (2006.01)
(52) U.S. Cl. .......................................... 15/314; 15/301
(58) Field of Classification Search .................. 15/301, 15/314
See application file for complete search history.

(56) References Cited

U.S. PATENT DOCUMENTS

| 3,676,986 | A | * | 7/1972 | Reiling ........................ 55/472 |
| 4,111,615 | A | | 9/1978 | Watanabe |
| 5,068,555 | A | | 11/1991 | Oberdorfer-Bögel |
| 5,740,581 | A | | 4/1998 | Hatrelson, II |
| 5,740,582 | A | | 4/1998 | Hatrelson, II |
| 5,918,728 | A | | 7/1999 | Syverson |

(Continued)

FOREIGN PATENT DOCUMENTS

EP          552978 A2    7/1993

(Continued)

*Primary Examiner*—Joseph J Hail, III
*Assistant Examiner*—Shantese McDonald
(74) *Attorney, Agent, or Firm*—Dowell & Dowell, PC

(57) ABSTRACT

A cleaner (1) has a DC brushless motor (15) with stator (203) and rotor (212). Stator is mounted on a shaft and rotor is mounted inside and to a tubular body (207) about stator (203). Impeller (17) is mounted to and outside tubular body (207). The motor (15) and impeller (17) are mounted in a housing having an intake (17) and an exhaust (9). Operation of the motor and rotation of the impeller causes a partial vacuum at the intake (7) to draw air. The air is exhausted through the exhaust (9). A filter (61) prevents particles from entering the motor (15). Particles are collected in a receptacle (5) prior to the filter (61). The impeller (17) may be a squirrel cage fan, bladed fan, or centrifugal fan. A secondary exhaust (11) expels particles from the filter (61) and/or receptacle (5) by rotation of the impeller (17) in an opposite direction or by the use of a secondary DC motor and impeller. The housing (2) can fit in a cavity between conventional wall studs.

26 Claims, 25 Drawing Sheets

U.S. PATENT DOCUMENTS

| | | | |
|---|---|---|---|
| 6,206,181 B1 * | 3/2001 | Syverson | 198/788 |
| 6,232,696 B1 * | 5/2001 | Kim et al. | 310/156.37 |
| 6,244,427 B1 | 6/2001 | Syverson | |
| 6,323,570 B1 | 11/2001 | Nishimura et al. | |
| 7,114,216 B2 * | 10/2006 | Stephens et al. | 15/326 |
| 7,406,744 B2 | 8/2008 | Bruneau | |

FOREIGN PATENT DOCUMENTS

| | | | |
|---|---|---|---|
| JP | 08240329 | * | 9/1996 |
| WO | WO9737423 A2 | | 10/1997 |
| WO | WO9741631 | | 11/1997 |
| WO | WO9956606 A1 | | 11/1999 |

* cited by examiner

SUCTION MOTOR FOR VACUUM CLEANER

CROSS-REFERENCE TO RELATED APPLICATIONS

This application claims the benefit of the filing date of U.S. Provisional Patent Application No. 60/363,351 filed 12 Mar. 2002 by the same inventors as listed in this application and entitled SUCTION DEVICE FOR VACUUM CLEANER. This is the specific reference to the provisional application that is required under 35 U.S.C. 119(e). It also claims priority from the above application.

TECHNICAL FIELD

The invention relates to cleaning apparatuses. More particularly, the invention relates to cleaning apparatuses using air as the transit mechanism.

BACKGROUND ART

Cleaning apparatuses typically operate by using a partial vacuum to draw air and particles suspended in the air, such as dirt, into the cleaner where the particles are separated from the air. Vacuum is created using an AC motor that turns a shaft attached to an impeller. As the shaft spins the impeller rotates and draws air into the cleaner and exhausts the air from the cleaner.

For a central vacuum cleaning system the AC motor and impeller sit within a canister that is mounted in a room of a house or other structure. As the motor rotates the impeller, particles are collected within the canister. To remove the particles, the canister is opened and a portion of the canister is removed and dumped upside.

Typically the canister is mounted in the basement or another out of the way place, as the canister can be noisy, dirty and unsightly. The canister must remain easily accessible for emptying.

Upright vacuum cleaners operate in a similar manner; however, the cleaner is portable.

The owner of the central vacuum cleaning system or upright cleaner must check periodically to see if the canister requires emptying.

Alternative upright vacuum cleaners or central vacuum cleaning systems are desirable.

DISCLOSURE OF THE INVENTION

In a first aspect the invention provides a suction device for use in a cleaning apparatus that moves air. The device includes a casing that defines a substantially cylindrical cavity and the casing has first and second opposing ends and a first axis. The first end has an intake, and the second end has an exhaust. A DC brushless motor is contained within the cavity. The motor has a stator mounted to a shaft and the motor has a substantially cylindrical rotor mounted for rotation about the shaft. The shaft has a second axis and the shaft is fixedly mounted within the casing with the first and second axes aligned. An impeller is fixedly mounted for rotation with the rotor. The rotation of the impeller in a first direction causes air to be drawn through the intake and expelled through the exhaust.

The impeller may be mounted between the rotor and the casing. The impeller may be mounted about a reduced diameter portion of the rotor. The rotor may have an adaptor extending from one end, and the adaptor may have a reduced diameter from the remainder of the rotor. The reduced diameter portion may be an adaptor that is mounted at one end of the rotor. The one end of the rotor at which the adapter is mounted may be closer to the intake than the other end of the rotor.

The impeller may include a centrifugal fan. The impeller may include a multi-stage centrifugal fan.

The casing may have a diameter less than the depth of a wall stud of a conventionally framed structure. The casing may have a diameter of 5 and ½ inches or less. The casing may have a diameter of 3 and ½ inches or less.

In a second aspect the invention provides a central vacuum cleaning system including the above suction device and an air delivery apparatus. The casing has a diameter less than the depth of a wall stud of a conventionally framed structure, and the device is mounted within a wall cavity between wall studs of a conventionally framed house, and fluid connection is provided between the intake and the air delivery apparatus.

The system may have a filter between the intake and the air delivery apparatus. The filter prevents particles from entering the intake. The system may have a particle receptacle between the filter and the air delivery apparatus. A substantial portion of the particles are released into the receptacle from the air entering the intake before the air reaches the filter.

The system may have a first valve between the filter and the air delivery apparatus and a secondary exhaust between the filter and the first valve, the first valve having an open position to prevent air from passing through the first valve toward the air delivery apparatus and a closed position to permit air to pass through the first valve from the air delivery apparatus. The secondary exhaust is for exhausting trapped particles from the filter when the first valve is closed.

The rotation of the impeller in a second direction may cause air to be drawn from the exhaust and to be exhausted through the secondary exhaust. Closing of the first valve and opening of the secondary exhaust may cause air drawn from the exhaust to be exhausted through the secondary exhaust.

In any of the aspects, the impeller may be a set of fan blades substantially spaced equally about the rotor in an arc perpendicular to the first and second axes. The impeller may be a plurality of sets of fan blades, each set of fan blades substantially spaced equally about the perimeter of the rotor in an arc perpendicular to the first and second axes, the sets positioned from one another along the first and second axes.

The impeller may be a plurality of staged centrifugal fans.
The impeller may be a squirrel cage fan.

In a third aspect the invention provides a cleaning system including an upright vacuum cleaner with the suction device of the first aspect as a means for moving air through the cleaner.

BRIEF DESCRIPTION OF THE DRAWINGS

For a better understanding of the present invention and to show more were clearly how it may be carried into effect, reference will now be made, by way of example, to the accompanying drawings that show the preferred embodiment of the present invention and in which.

MODES OF CARRYING OUT THE INVENTION

Figure 1:
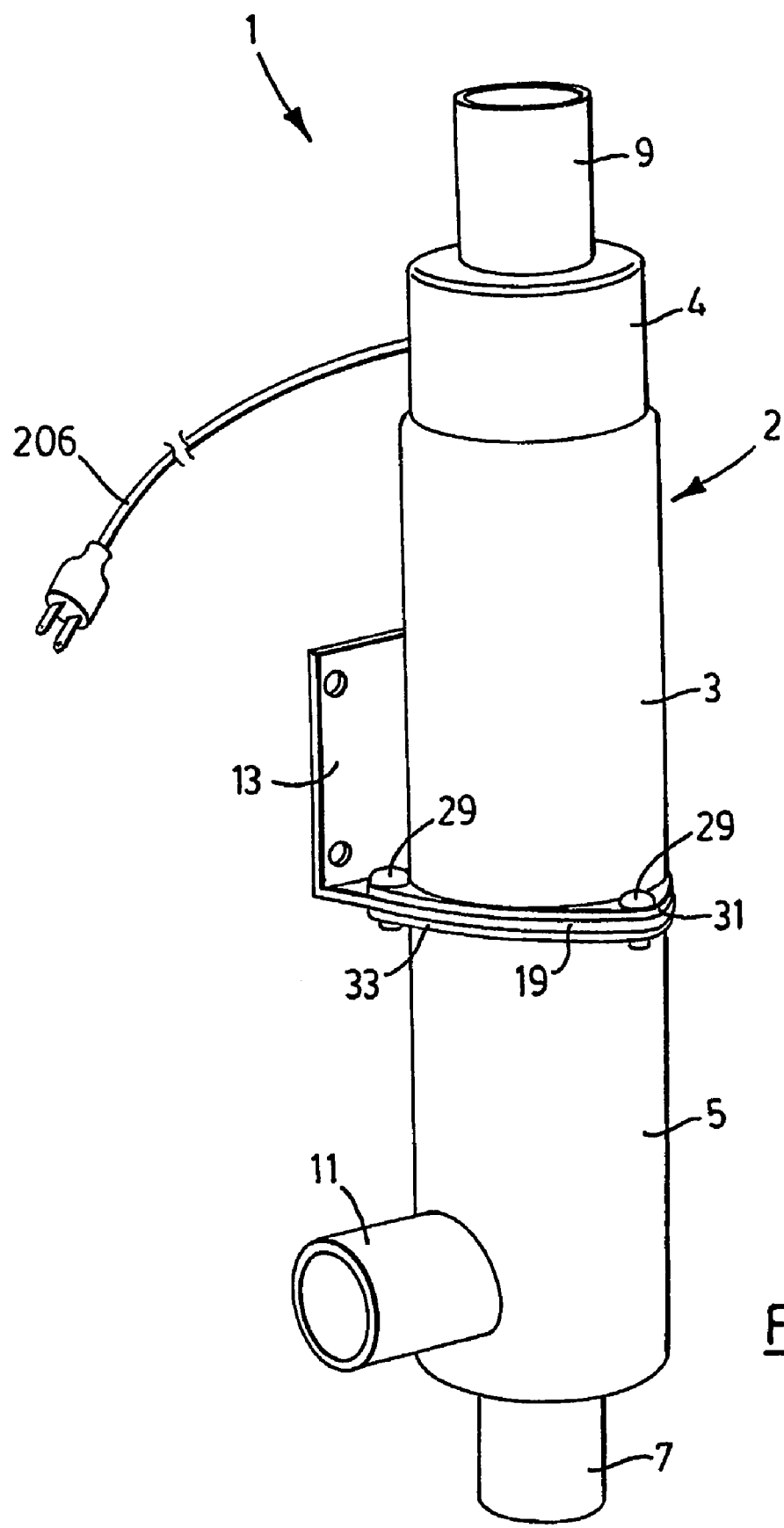
FIG. 1 is a perspective view of a suction device according to the preferred embodiment of the invention.

For ease of understanding elements having the same reference numerals have the same configuration and operation, except as otherwise noted. Accordingly, the description of such elements will not be repeated where such configuration and operation is similar.

Referring to FIG. 1, a suction device 1 has a generally cylindrical casing 2 that defines a substantially cylindrical cavity with vacuum motor housing 3, electronics housing 4, dirt chamber 5, dirt intake 7, primary exhaust 9, secondary exhaust 11 and mounting bracket 13.

Figure 2:
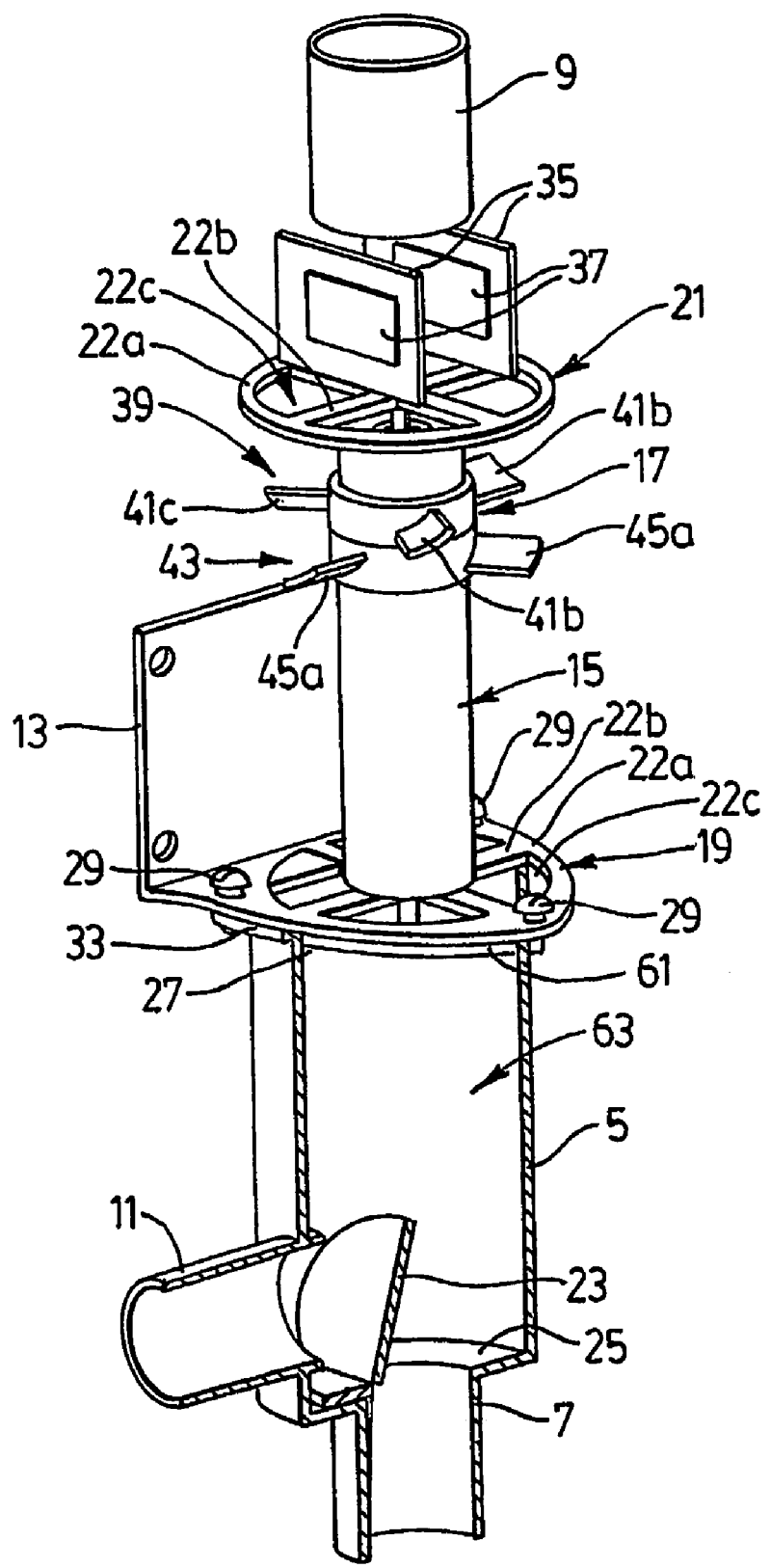
FIG. 2 is a perspective view of the device of FIG. 1 with its motor housing and electronics housing removed, and a portion of its lower portion cut-away.

Referring to FIG. 2, inside the motor housing 3 (which has been removed in FIG. 2) is a generally cylindrical DC brushless motor 15, and an impeller 17. The impeller 17 extends radially from the motor 15. First motor support plate 19 and second motor support plate 21 are at either end of the housing 3. As can be seen the mounting bracket 13 can be integrally formed with the first motor support plate 19.

The dirt chamber 5 (partially cut away) is generally tubular with a spring-loaded hinged dirt chamber door 23 enclosing one dirt chamber end 25 about the dirt intake 7.

Opposing end 27 of the dirt chamber 23 opens through the first motor support plate 19 into the motor housing 3. The dirt chamber 23, first motor support plate 19 and motor housing 3 are held in a releasable sealed arrangement by bolts 29 (also visible in FIG. 1) fitted through holes in a flange 31 of the motor housing 3 and holes in the first motor support plate 19 into threaded holes in a flange 33 of the dirt chamber 5.

Within the electronics housing 4 are two printed circuit boards 35 that contain control circuitry 37 for the motor 15. The boards 35 are held fixed in the air stream of the suction device 1 to provide cooling; while at the same time, the boards 35 are positioned to restrict air flow minimally. The boards 35 could be externally mounted.

The impeller 17 has a first set 39 of three fan blades 41a, 41b and 41c equally spaced about the circumference of the motor 15 and extending radially from the motor 15, and a second similar set 43 of three fan blades (only two of which, 45a and 45b are evident in FIG. 2). The blades of the set 39 are offset from the set 43 to create the effect of a single longer blade between adjacent blades for example 41a, 45a in different sets 39, 43. The sets 39 and 43 can be integrally formed or they may be separately formed and bonded together. The number of blades 41, 45 and sets 39; 43 will depend upon the particular specifications required for a particular application.

Figure 3:
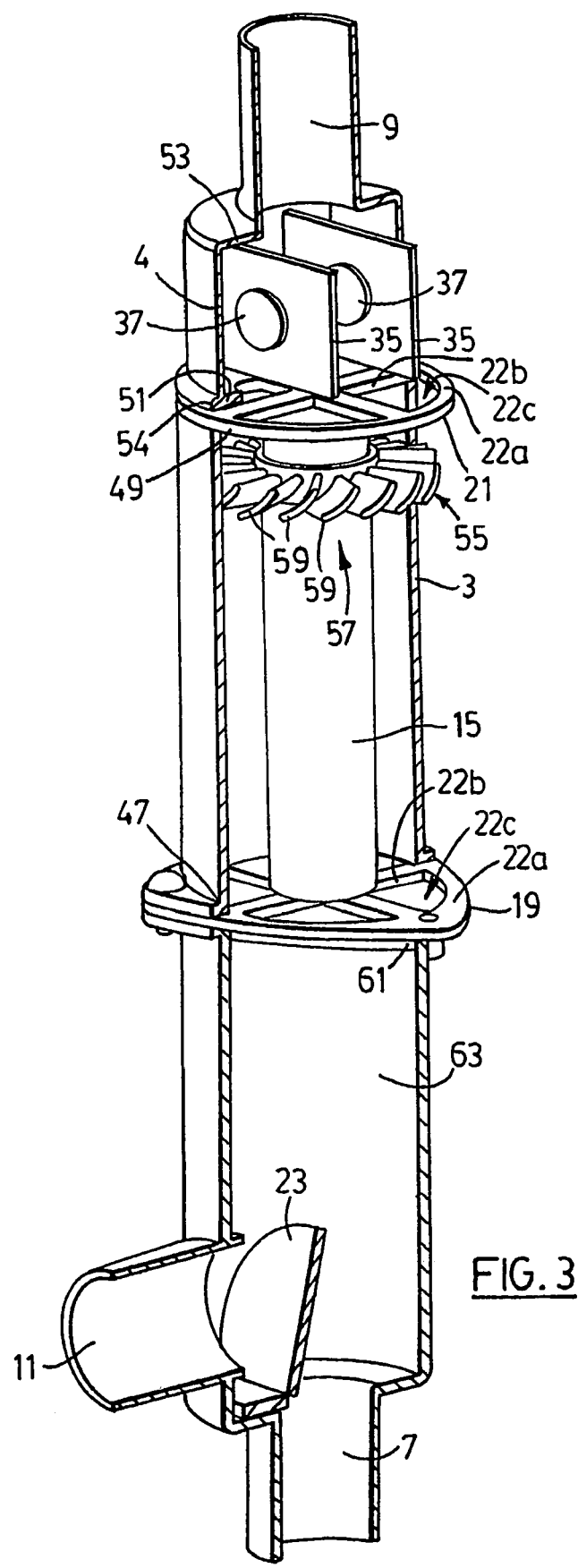
FIG. 3 is a cut-away perspective view of the suction device of FIG. 1 with an alternate impeller.

Referring to FIG. 1 and FIG. 3, the motor housing 3 and electronics housing 4 are generally tubular. The motor housing 3 opens at one end 47 through the first motor support plate 19 to the dirt chamber 5. At an opposing end 49 the housing 3 opens through the second motor support plate 21 to one open end 51 of the electronics housing 4. Opposing end 53 of the electronics housing 4 is enclosed except at the primary exhaust 9 and to provide connection, not shown, for external power and for controls and indicators on the outside of the casing 2.

The support plates 19, 21 have a wheel 22a and spoke 22b configuration. Openings 23c in the plates 19, 21 permit fluid connection between the dirt chamber 5 and the motor housing 3 and between the motor housing 3 and the electronics housing 4, respectively. As will be evident to those in the art, there are many other possible configurations to contain the motor 15 and impeller 17 and to hold in place the shaft 201 while permitting fluid connection between the intake 7 and the exhaust 9. Each such configuration falls within the principles described herein.

The electronics housing 4 steps in from the diameter of the motor housing 3 at step 54. This allows connection of the housing 4 via bolts through the step 54 and holes in the second support plate 21 into threaded holes in the housing 3. This maintains the housing 3 and 4 in sealed arrangement and maintains the second support plate in a fixed relationship with the housings 3 and 4.

Referring to FIG. 3, impeller 55 has a single set 57 of numerous fan blades 59.

A filter 61 resides within the dirt chamber 5 to prevent dirt from entering the motor housing 3. The dirt chamber 5 acts as a receptacle 63 to contain dirt that enters from the intake 7.

Figure 4A:
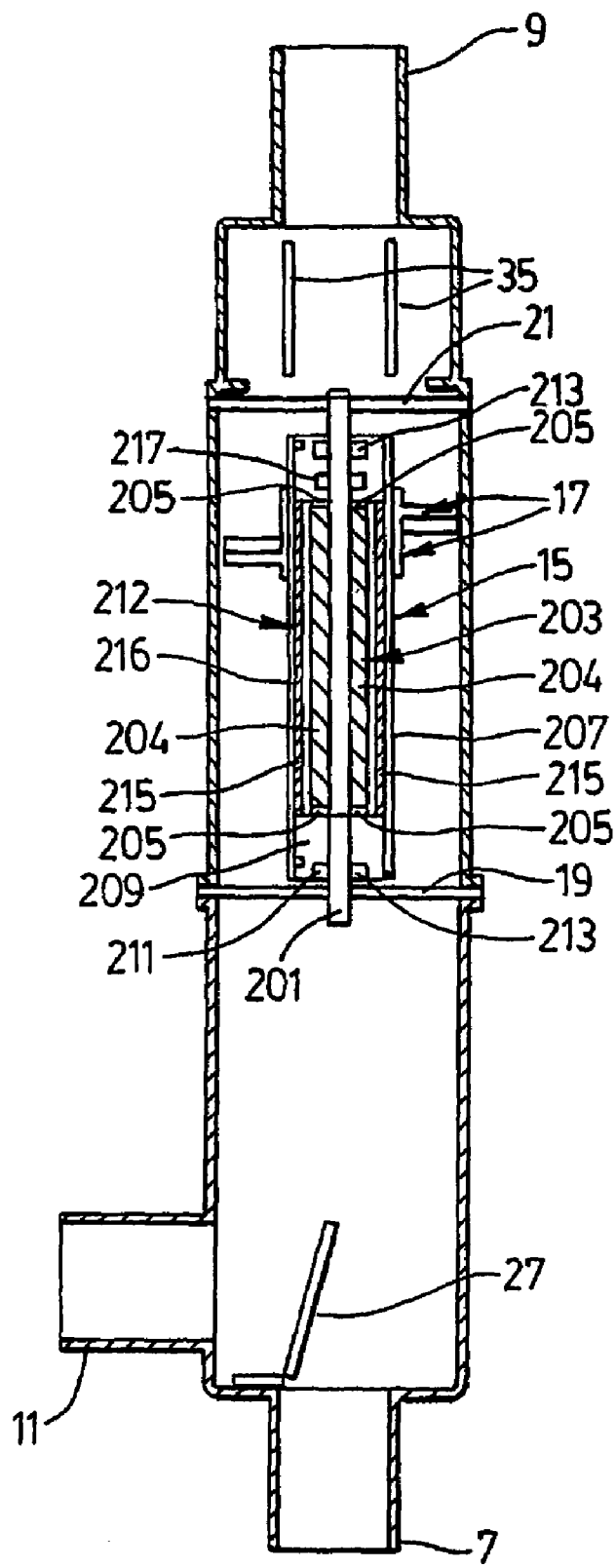
FIG. 4A is a longitudinal cross section of the suction device of FIG. 1.

Referring to FIG. 4A, the motor 15 is generally cylindrical and has a shaft 201 along its longitudinal axis. A stator 203 is mounted to the shaft 201 along the longitudinal axis. The stator 203 has a core 204 with windings 205 that are connected to the control circuitry 37 on the printed circuit boards 35. The control circuitry 37 accepts mains power of 110-230 volts AC or greater and provides DC voltage to the motor 15 (see mans power cord 206, FIG. 1).

The motor 15 has a generally tubular body 207 about the stator 203. The body 207 will typically be formed from steel for durability; however, other materials may be used. The body 207 is enclosed at either end by circular caps 209 that have a central cavity 211 into which are inserted ring bearings 213. This permits the body 207 to rotate about the shaft 201.

On the interior of the body 207 is a set of longitudinal permanent magnets 215 of alternating poles formed in a tube 216. The tube 216 rotates with the body 207. The shaft 201 is held by the first motor support 19 and second motor support 21 in fixed relationship with the motor housing 3.

The motor body 207 is caused to rotate by energizing sequentially the windings 205 of the stator 203 with DC voltages of alternating phases to cause some of the windings 205 to attract one pole of the magnets 215 then, as that pole of magnets 215 passes the attracting windings 205, to repel that pole of magnets 215. The structure and operation of a DC brushless motor similar to that described herein is described in U.S. Pat. Nos. 6,206,181 B1 and 5,918,728 of Charles D. Syverson issued Mar. 27, 2001 and Jul. 6, 1999 under titles Gearless Motorized Conveyor Roller and Gearless Motorized Roller With Variable Frequency Controller, respectively. Many different configurations of core 204, windings 205, phases, timing and other design elements of DC brushless motors in general are known. The particular configuration of the DC brushless motor 15 will be a matter of design choice to fulfil the principles outlined herein.

The body 207 and the magnets 215 form a rotor 212 of the motor 15. In addition to the configuration of rotor 212 around stator 203, DC brushless motor 15 has a number of advantages over traditional AC motors. The motor 15 can be very efficient, up to 92% or more efficient versus approximately 40% efficiency for a traditional AC motor. There is no carbon contamination from brushes. The motor 15 can be very small, down to approximately an inch in diameter. The motor 15 can be quiet when compared to an AC motor. Less maintenance will generally be required.

The timing, and polarity and quantity of the voltage, of the energizing of the windings 205 is controlled by the control circuitry 37. The timing of the energizing of the windings 205 will also determine the direction of rotation of the body 207. A sensor 217, for example a Hall effect sensor, may be used to determine the speed of the rotation of the body 207 for control purposes.

It is expected that for most design configurations the motor 15 will be operated in a range between 10,000 and 25,000 rpm, typically over 15,000 rpm, to provide sufficient suction for central vacuum system applications. Suction for vacuum cleaner suction devices is typically measured in terms of water lift. 2" to 3.9" of water lift is sufficient for most vacuum cleaner applications for which the suction device 1 is intended.

Figure 4B:
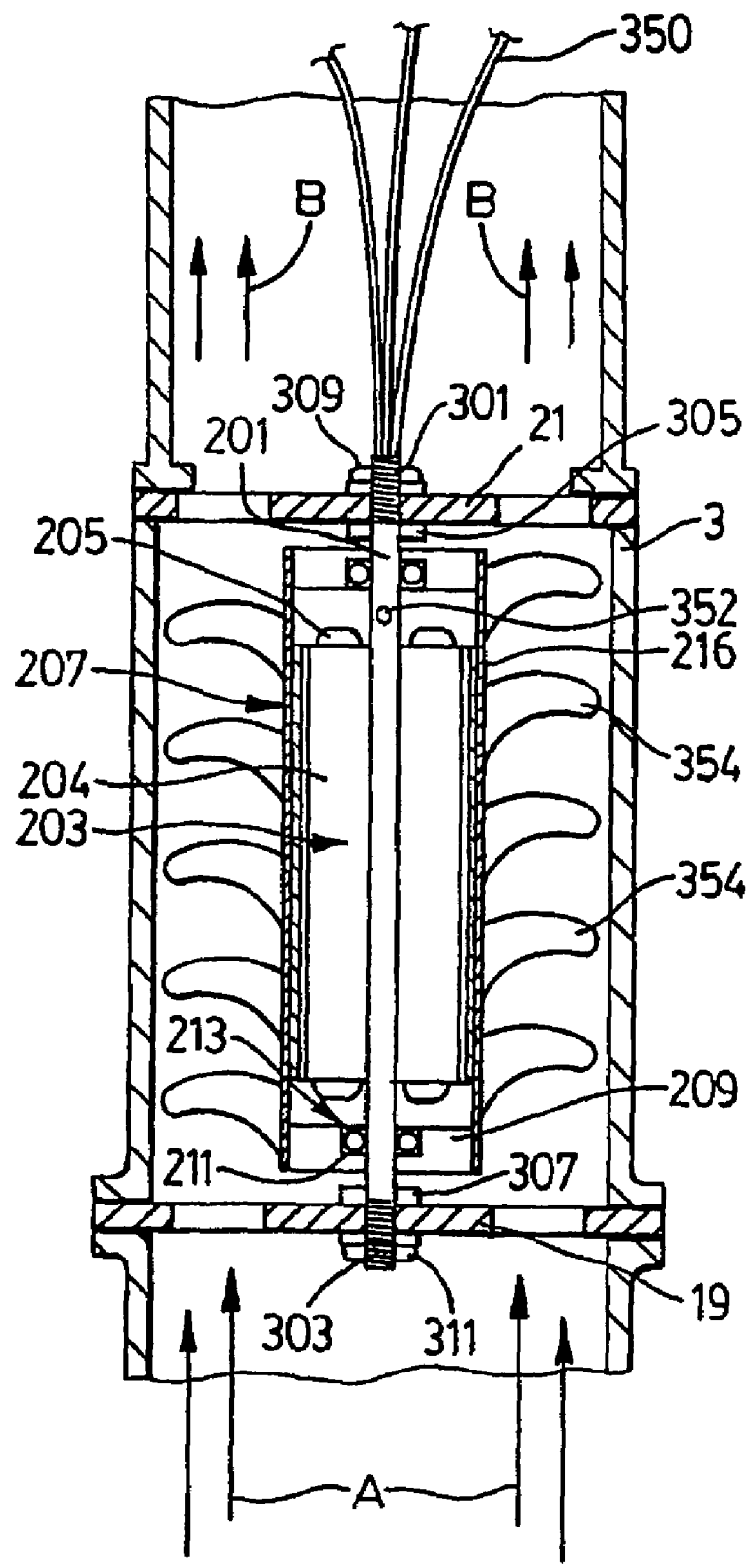
FIG. 4B is also a longitudinal cross section of the suction device of FIG. 1

Referring to FIG. 4B, certain elements of the motor 15 are shown in greater detail. Ends 301, 303 of shaft 201 are threaded. An annular locking base 305, 307 is provided for each end 301, 303, respectively. The bases 305, 307 are fixed to the shaft 201 and position the shaft between support plates 21, 19. Locking nut/washer combinations 309, 311 are threaded onto each end 301, 303, respectively, to fix the shaft 201 to the motor mounts 21, 19.

Figure 4C:
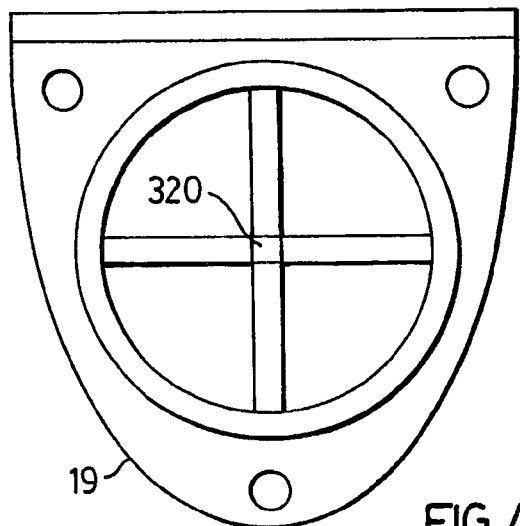
FIG. 4C is a plan view of an alternative support plate for the suction device of FIG. 1.
Figure 4D:
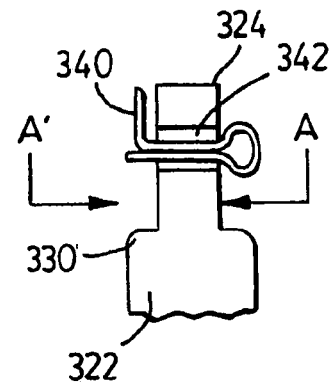
FIG. 4D is a longitudinal cross section of an alternative shaft profile for the suction device of FIG. 1.
Figure 4E:
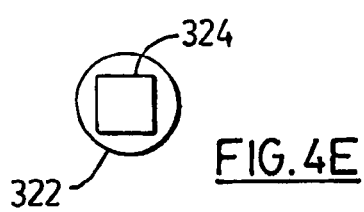
FIG. 4E is a plan view of the profile of FIG. 4D.
Figure 4F:
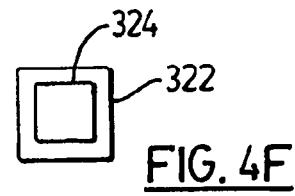
FIG. 4F is a plan view of a further alternate profile for the shaft of FIG. 4D.
Figure 4G:
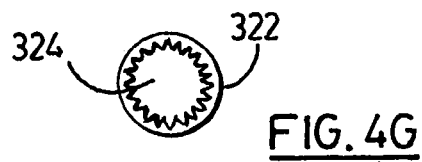
FIG. 4G is a plan view of another further alternate profile for the shaft of FIG. 4D.

Referring to FIGS. 4C-4G, an alternative means of fixing the shaft 201 to the support plates 21, 19 is shown. Referring to FIG. 4C, support plate 19 and support plate 21, not shown, are provided with non-circular opening 320. In the configuration shown, the opening 320 is square. Referring to FIGS. 4D-4F, the shaft 201 has a central profile 322 between the ends 301, 303 and end profile 324 at the ends 301, 303. The central profile 322 is larger than the end profile 324 at least in some locations about the circumference. Examples of practical profiles include square end profile 324 and circular central profile 322 (FIG. 4E), square end profile 324 and larger square central profile 322 (FIG. 4F), and gear tooth end profile 324 and circular central profile 322 (FIG. 4G).

The non-circular end profile 324 corresponds to the non-circular opening 320 in the support plates 19, 21. This fixes the shaft 201 against rotation with respect to the housing 3.

The larger central profile 322 provides a shoulder 330 that rests against the support plates 19, 21 and olds the central profile 322 of the shaft 201 between the plates 19, 21.

Referring again to FIG. 4D, a cotter pin 340 fitted through a bore 342 in the end profile 322 is used to further fix lateral movement of the shaft with respect to the plates 19, 21. Many other lateral fixing means are possible, such as a threaded third profile and locking nut, not shown, at the outside ends of the shaft 201.

Referring again to FIG. 4B connection between the armature coils 205 and the control circuitry 37 is by way of leads 350 fed through opening 352 to a hollow, not shown, in shaft 201. Impeller blades 354 represent a generic rotating axial flow multiple stage impeller. Other impellers are further described elsewhere in this specification.

When the impeller blades 354 are rotated in one direction, inlet air (arrows A) is drawn through the impeller 354 and exhaust air (arrows B) is expelled from the impeller 354.

Figure 5:
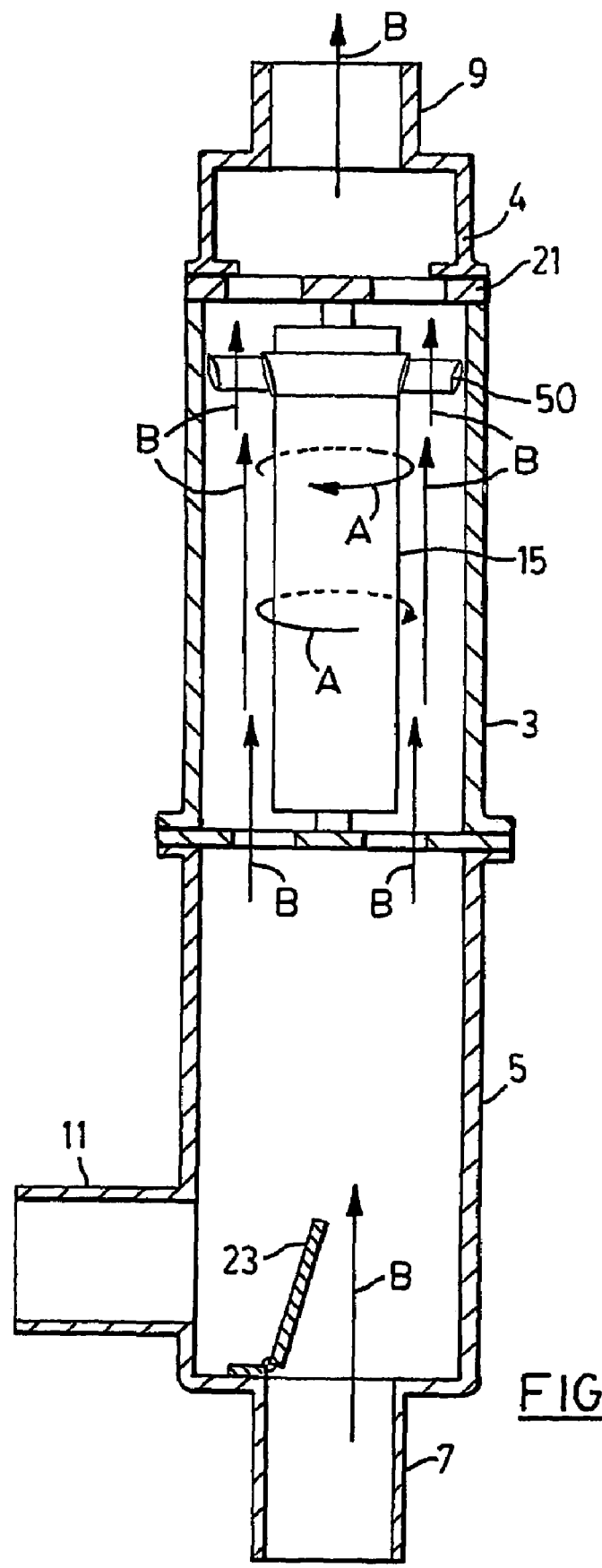
FIG. 5 is a cross-section of the suction device of FIG. 3 showing rotation and flow patterns.

Referring to FIG. 5, as the motor 15 rotates in one direction (arrows A) the impeller 55 rotates with it. A partial vacuum is created in the dirt chamber 5 and the door 23 opens to draw air (arrows B) from the intake 7. The air is exhausted through the primary exhaust 9.

Figure 6:
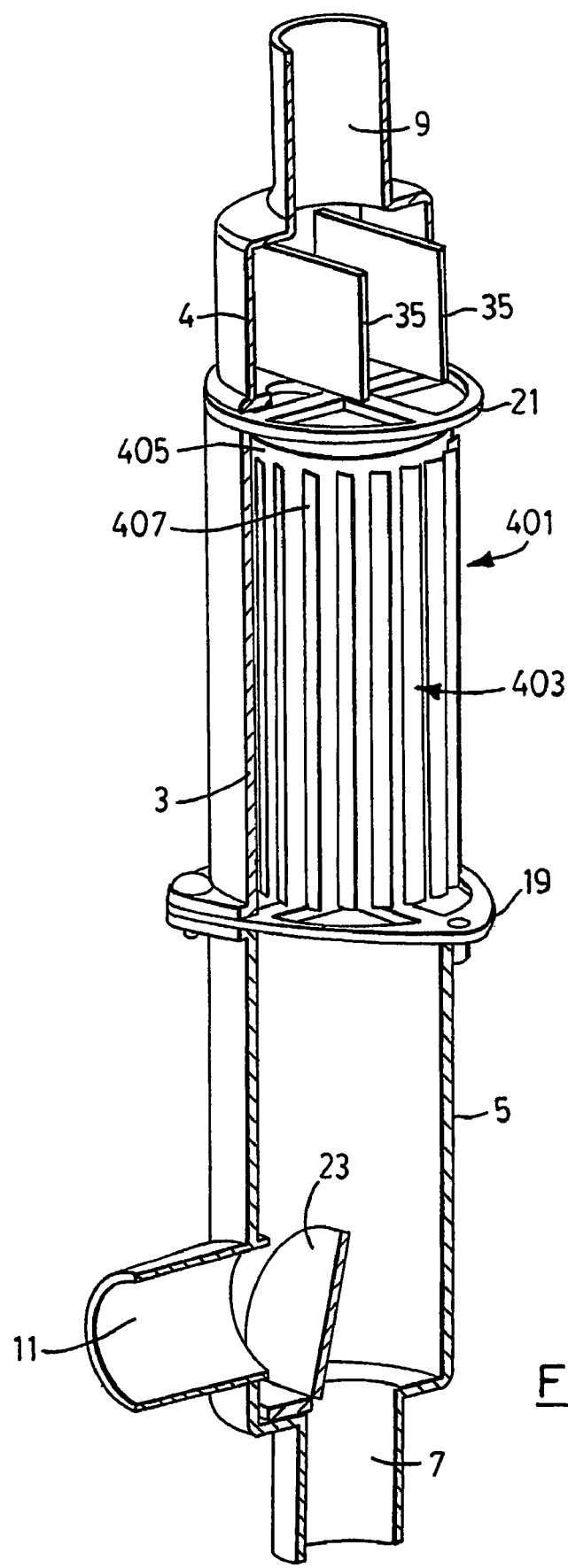
FIG. 6 is a cut-away perspective view of the suction device of FIG. 1 with a squirrel cage fan impeller.

Referring to FIG. 6, impeller 401 is a squirrel cage fan 403 with a tubular center portion 405 and a plurality of longitudal blades 407 punched out on three sides from the center portion 405 and angled away from the motor 15. One end of the fan 403 has a cap 409 to provide the necessary air flow path. It may also be necessary to direct air flow to the inside of the fan 403 to create proper air flow.

Figure 7:
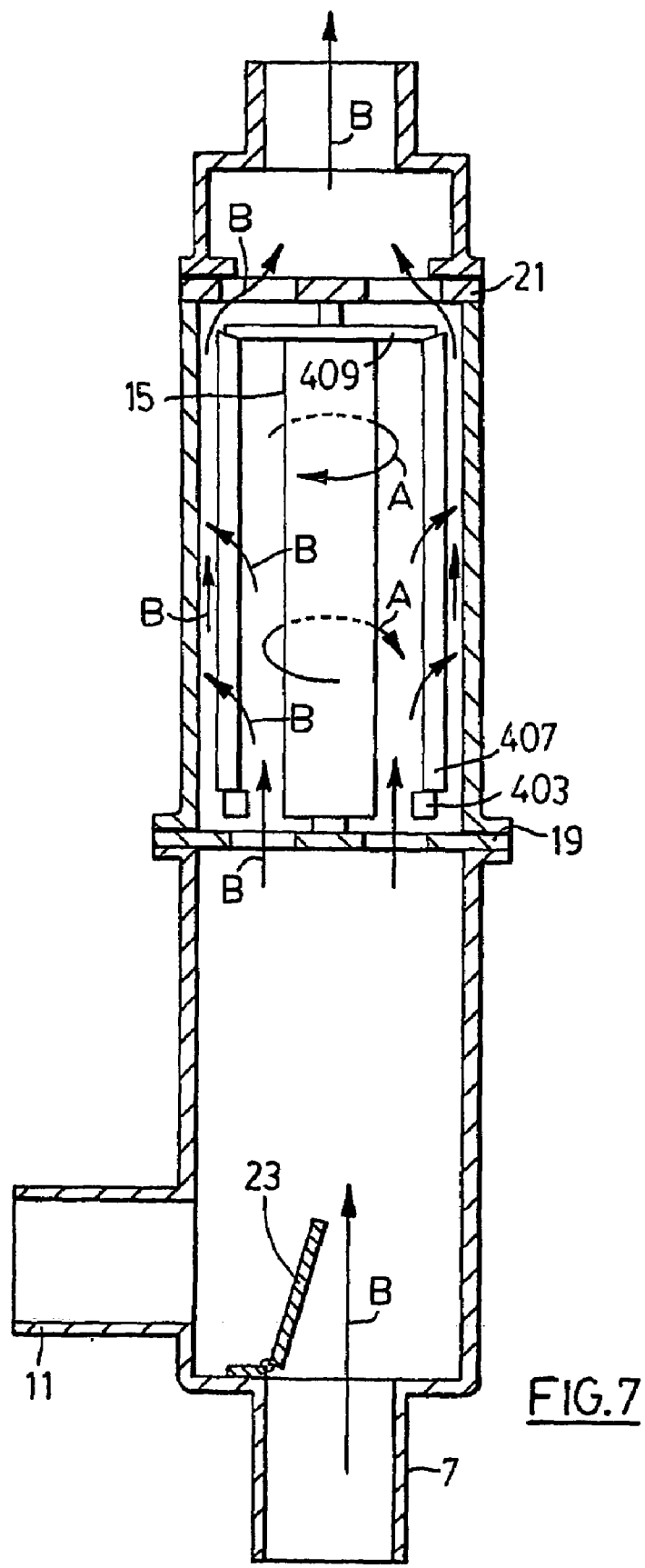
FIG. 7 is a longitudinal cross-section of the suction device of FIG. 6 showing rotation and flow patterns.

Referring to FIG. 7, the blades 407 pull air (arrows B) from near the motor housing 3 into the fan 403 toward the motor 15 when the fan 403 is rotated one direction (arrows A).

Figure 8:
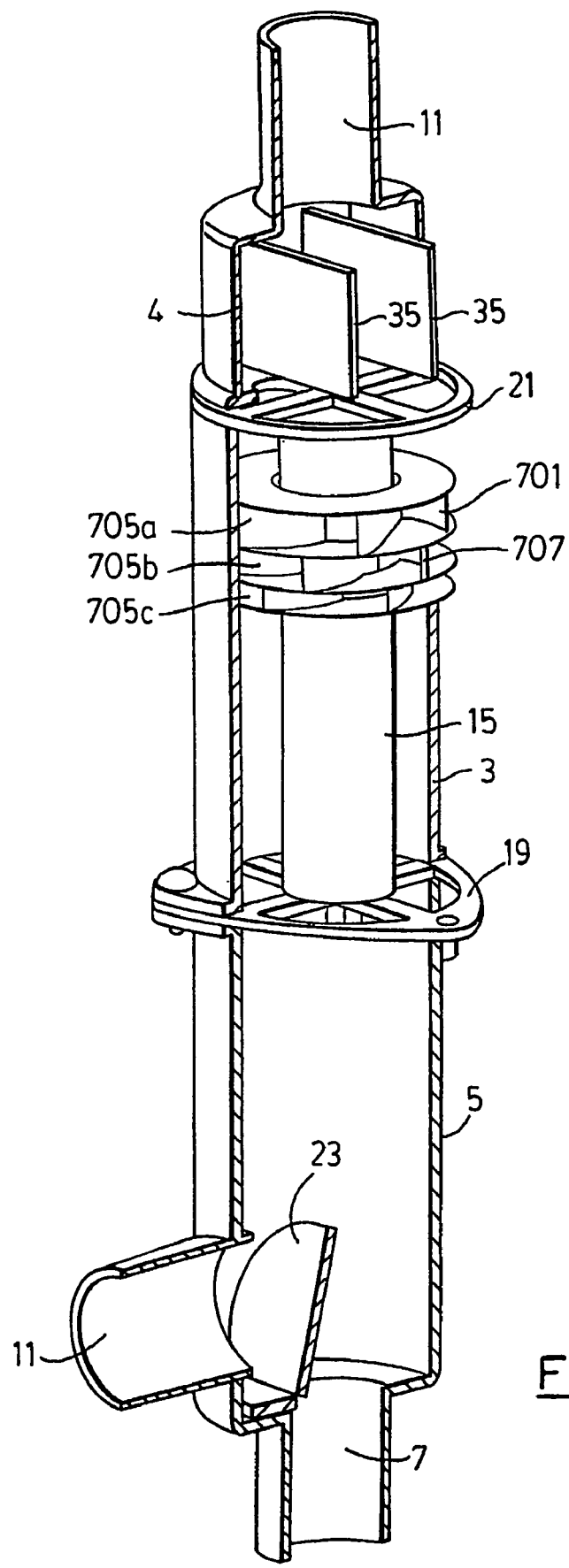
FIG. 8 is a cut-away perspective view of the suction device of FIG. 1 with a multi-stage centrifugal fan impeller.

Referring to FIG. 8, impeller 701 is a multi-stage series of centrifugal fans 705a, 705b, 705c having fan blades, for example blade 707. The design of multi-stage centrifugal fan blades is well known. Each successive stage is thinner than the previous stage to create an increase in suction through the stages.

Figure 9:
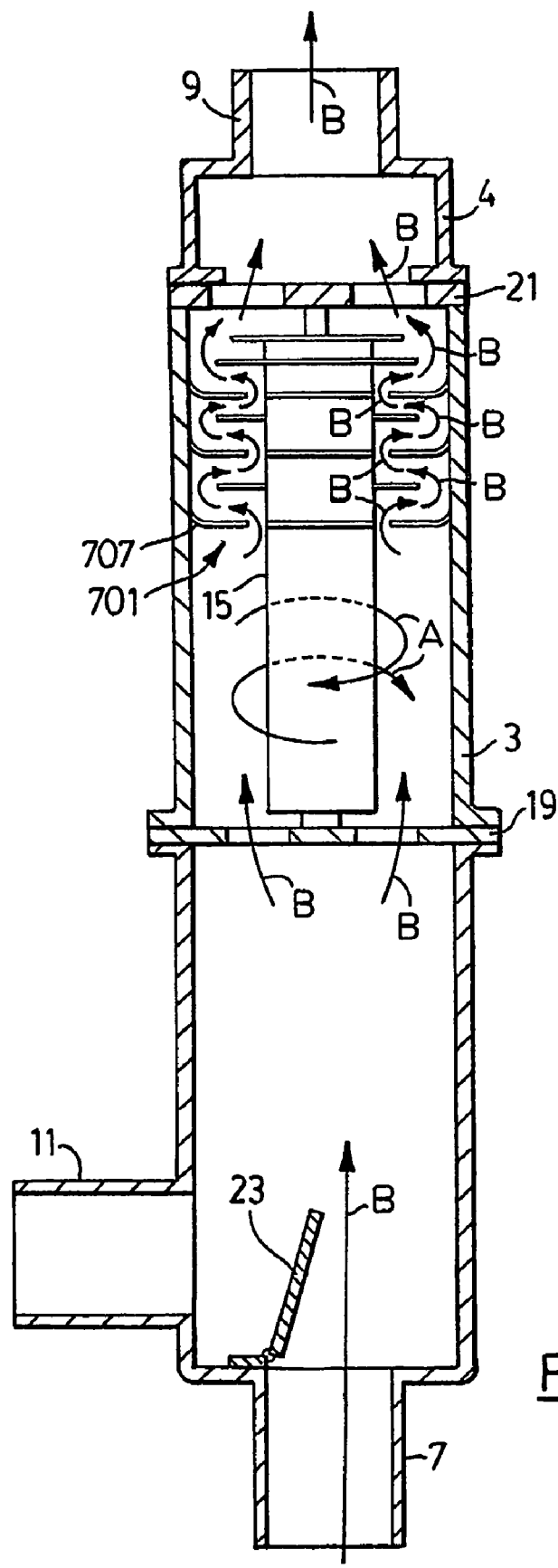
FIG. 9 is a longitudinal cross-section of the suction device of FIG. 8 showing rotation and flow patterns.

Referring to FIG. 9, as the impeller 701 spins (arrows A) so that the blades 707 cut into the air (arrows B), air is drawn from the intake 7 through the stages of the impeller 701 and expelled through the primary exhaust 9.

Figure 10:
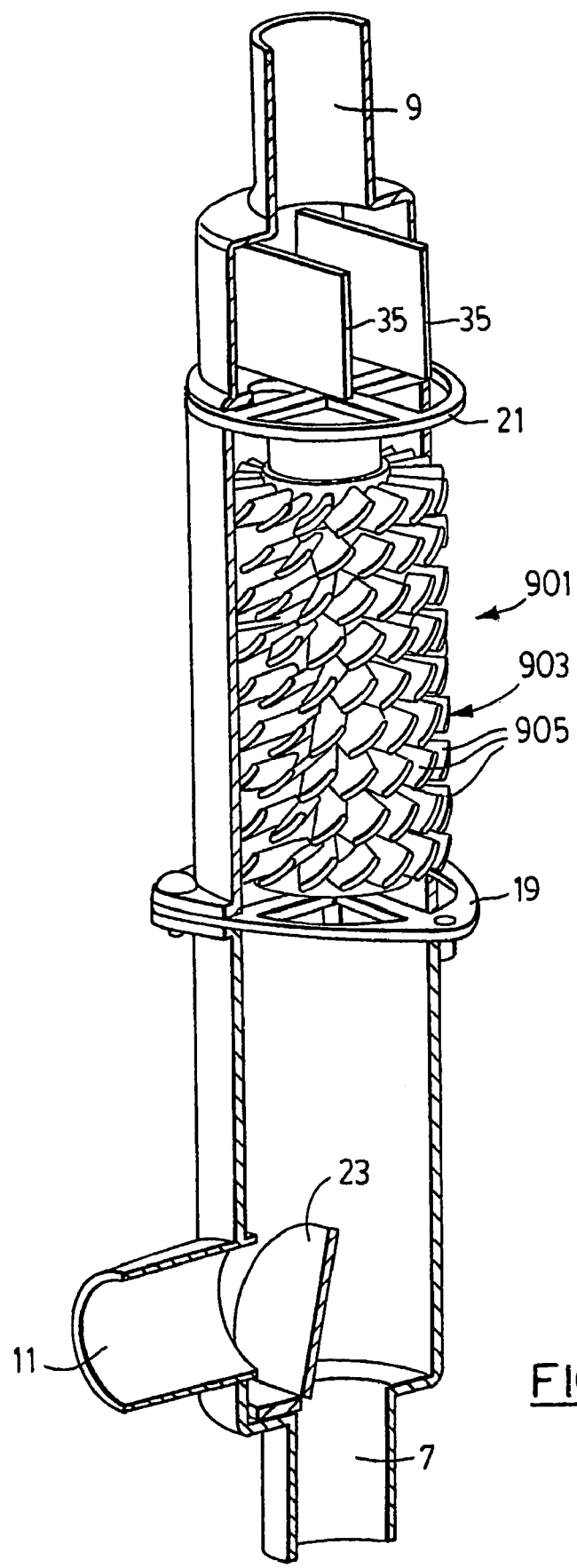
FIG. 10 is a cut-away perspective of the suction device of FIG. 1 with a multiple set of multiple fan blades impeller.

Referring to FIG. 10, extending the impeller 55 if FIG. 3, impeller 901 is made up of a large number of sets, for example set 903. Each set 903 has a large number of fan blades, for example blades 905.

Figure 11:
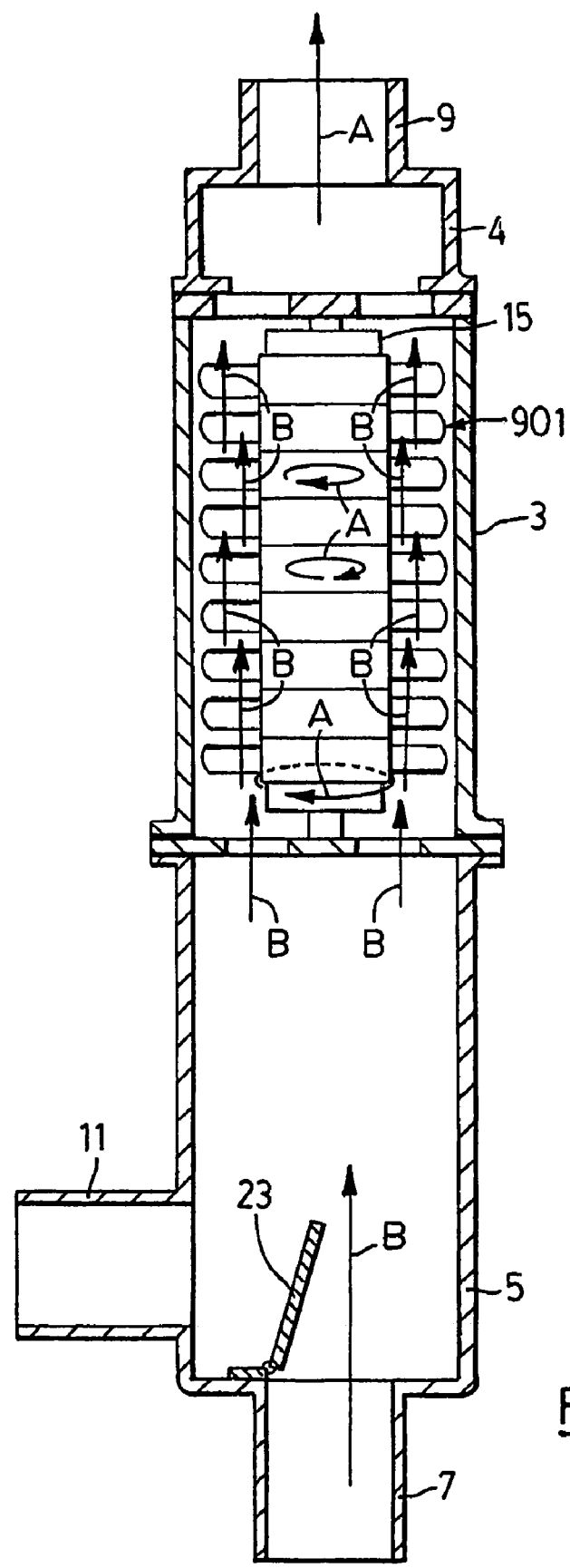
FIG. 11 is a longitudinal cross-section of the suction device of FIG. 10.

Referring to FIG. 11, as the impeller spins 901 in one direction (arrows A) air (arrows B) is again drawn from the intake 7 through the impeller 901 and expelled through the primary exhaust 9.

Referring generally to the Figs., there is a close spacing between the impellers 17, 55, 401, 701, 901 and the casing 2, perhaps a few thousands of an inch. This promotes efficiency in drawing air through the motor 15.

As has been described, the impellers 17, 55, 401, 701, 901 are ordinarily caused by the control circuitry 37 to rotate in a direction go as to draw air through the intake 7 and expel it through the exhaust 9. It is possible to use the control circuitry 37 to cause the impellers 17, 55, 401, 701, 901 to rotate in the opposite direction, in "empty mode". This will cause air to be drawn in through the primary exhaust 9 and to be expelled through the secondary exhaust 11, while closing the door 23. This cleans any filters and empties the dirt chamber 5.

A sensor, not shown, can be provided in the dirt chamber 5 and connected to the control circuitry 37. The sensor can indicate to a user a level of dirt where the device 1 should be placed in "empty mode". Alternatively, the device 1 can be automatically placed in "empty mode" by the control circuitry 37 when the device 1 is next turned off for a given period of time, for example three minutes or more. This period of time allows for those situation where the user may simply be moving between cleaning operations. When the device is in "empty mode" then the control circuitry will lockout operation of the motor for normal cleaning.

A door, not shown, (similar to door 23, although acting in an opposite manner) will be required in line with the secondary exhaust 11 to prevent the flow of air from the dirt chamber while the motor 15 is operating so as to draw air from the intake 7 and expel it through the exhaust 9. When the motor 15 is operated so as to intake air from the exhaust 9 and expel it through the exhaust 11, the door will open. Such a door has not been included in the device 1 as one can be placed at the end of a run where secondary exhaust 11 exits.

Another door, not shown, acting in the same manner as the door 23 may also be required to allow air to be drawn in through the exhaust 9 when the motor 15 is in "empty mode" as the exhaust 9 would ordinarily be terminated in a door, not shown, that would prevent air from entering through the exhaust.

A further door, not shown, could be used to isolate the exhaust 9 from its termination point when the motor 15 is run in "empty mode". After this door the exhaust 11 could join the remaining run of the exhaust 9. This means that the two exhausts 9, 11 can use a single termination run. This reduces vent runs and the number of vents that exit a structure.

The various doors, including door 23, act as valves to allow and prevent the flow of air. Doors such as those described herein are simple and effective means of providing such valves. Other valve means can be used as will be evident to those skilled in the art.

Figure 12:
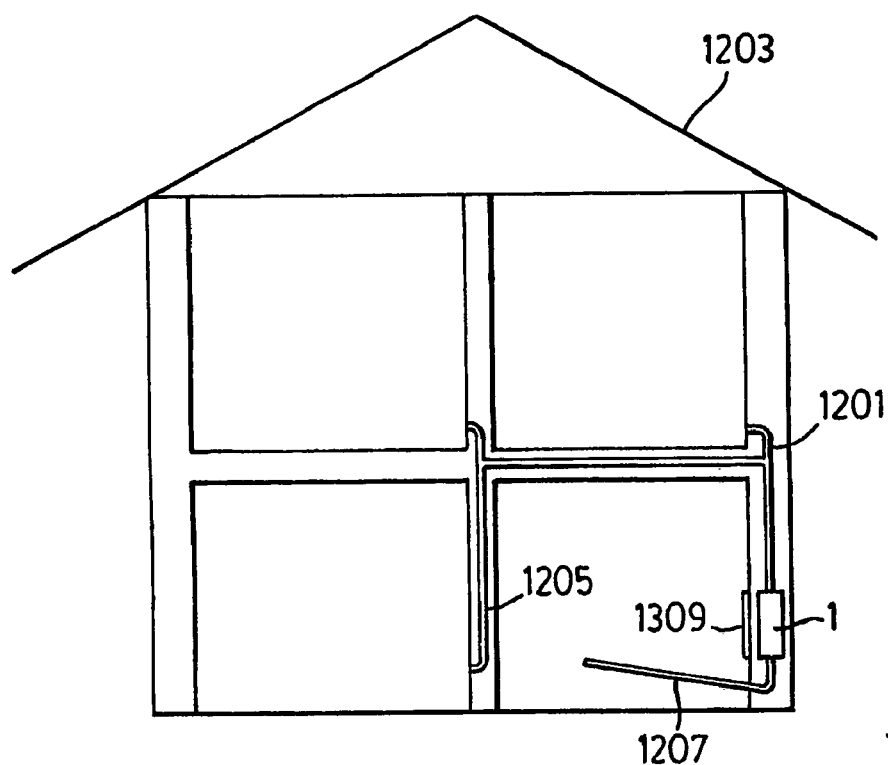
FIG. 12 is a cross-section of a house with a central vacuuming system using the suction device of FIG. 10.

Referring to FIG. 12, the suction device 1 can be used in a central vacuum system 1201 of a house, or other structure, 1203 for connection to the various tubes 1205 and hoses 1207 that make up the air delivery apparatus for the system 1201.

Figure 13:
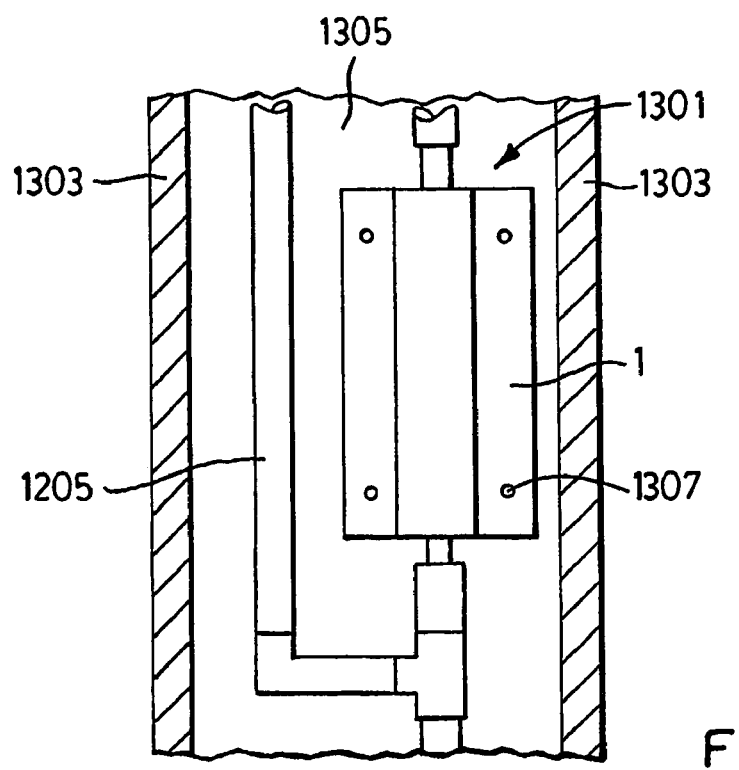
FIG. 13 is a cross-section of a partial wall cavity of the house of FIG. 12 showing a portion of the central vacuuming system, including the suction device of FIG. 10.

Referring to FIG. 13, the motor 15 can be of a very narrow diameter, for example, the body 207 can be 1.125" in diameter or less. This permits the device 1 to be small enough to fit within a cavity 1301 between two wall studs 1303 of a conventionally framed structure. For example, the device 1 can be less than 5 and ½ inches deep and 14½" wide to fit within a cavity between nominal 2 inch by 6 inch studs on 16 inch centers, or less than 3 and ½ inches deep and 14 and ½ inches wide to fit within a cavity between nominal 2 inch by 4 inch studs on 16 inch centers. Preferably the housing 3 would have external diameter of 3" or less. The cavity 1301 may be backed by plywood or the like 1305 to permit the device 1 to be mounted by screws or the other fastening means 1307. Referring again to FIG. 12, cavity 1301 may have an access door 1309.

Figure 15:
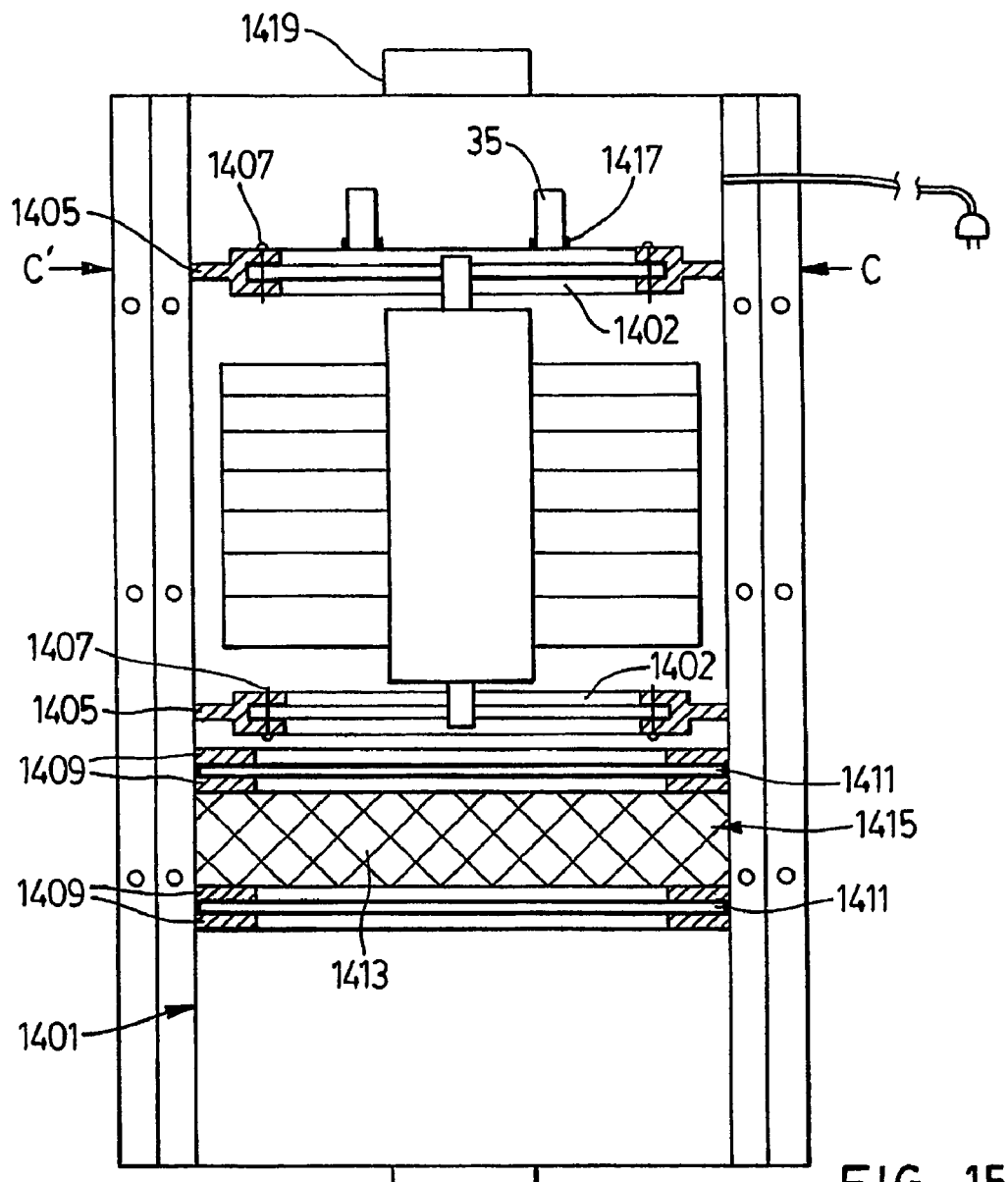
FIG. 15 is a front view of a base of the suction device of FIG. 14 with a front cover removed.
Figure 14:
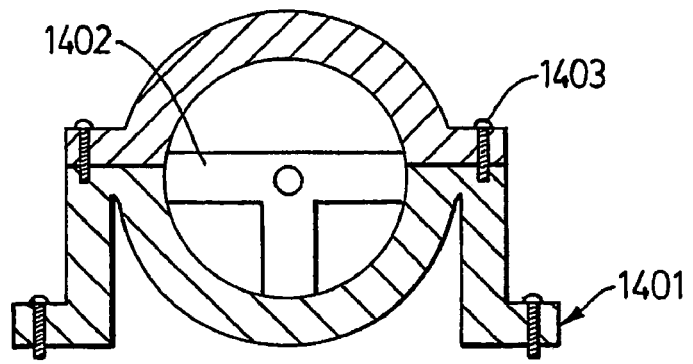
FIG. 14 is a top view cross-section of an alternative clamshell casing suction device.

Referring to FIGS. 14 and 15, the casing 2 could be replaced by casing 1401 of a clamshell design. Casing 1401 is divided longitudinally to permit easy access to, and factory installation of, internal components, and simplified manufacturing. The casing 1401 is held together by bolts 1403. Many other means could be used to hold together the casing. For example, on one side the casing 1401 could be held together by hinges, not shown, to allow the casing to swing open. The casing 1401 can be injection moulded in two halves.

Circumferential positioning bosses 1405 laterally hold in place support plates 1402. The support plates 19, 21 can be prevented from rotating by many different means, including for example bolts 1407. Other circumferential bosses 1409 laterally hold in place filter dividers 1411. Filtration material 1413 is trapped between the filter dividers 1411. The filter dividers 1411 and that part of the casing 1401 between the dividers 1411 create a filter housing 1415. Other embodiments described herein could be provided with a filter housing and filtration material as the filter 61.

The circuit boards 35 can be held in place by snap fit in opposing sets of bosses 1417 extending toward the exhaust outlet 1419 form and across bosses 1405.

Figure 17:
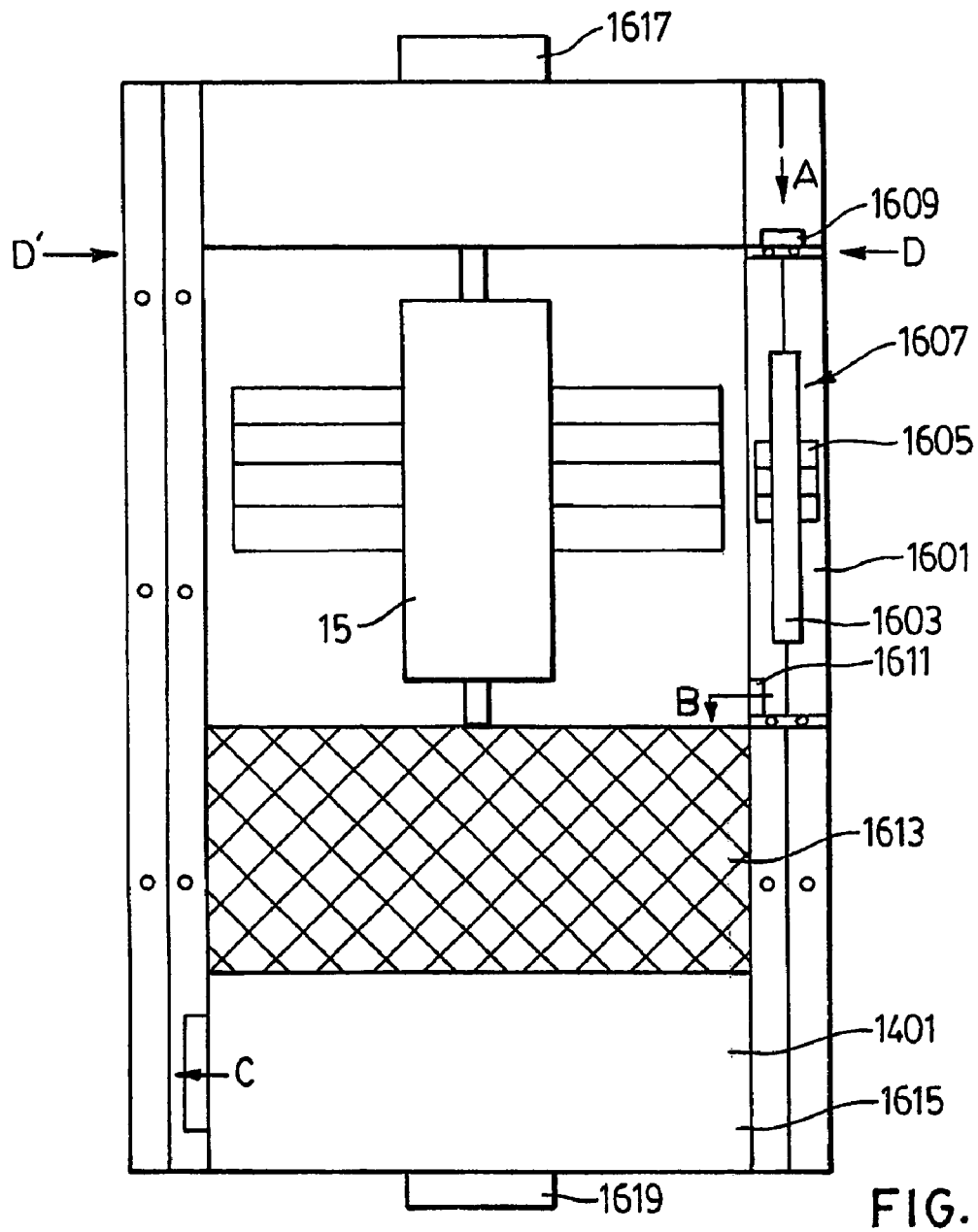
FIG. 17 is a front view of a base of the suction device of FIG. 16 with a front cover removed.
Figure 16:
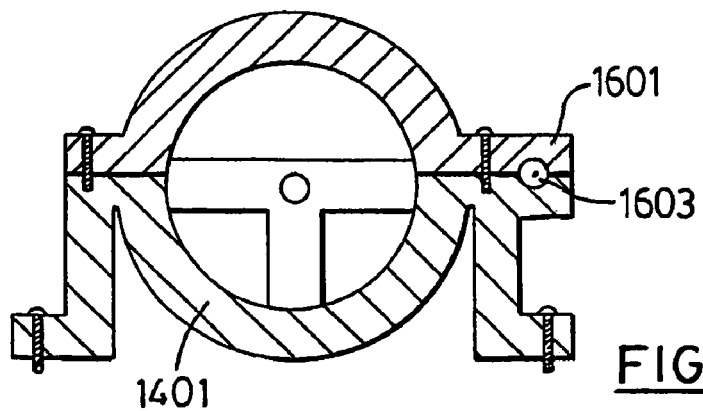
FIG. 16 is a top view cross-section of the suction device of FIG. 14 with a secondary motor housing.

Referring to FIGS. 16 and 17, a secondary motor housing 1601 can be added to the casing 1401. The housing 1601 contains a secondary motor 1603 with impeller 1605 that operates in a similar manner to motor 15 and corresponding previously described impellers to create a secondary suction device 1607. There is an intake 1609 into the housing 1601 and an exhaust 1611 into the motor housing of the casing 1401. When it is desired to clean out the filter material 1613 and the dirt chamber 1615, primary exhaust outlet 1617 and primary intake 1619 are closed, and secondary intake 1609 and secondary exhaust 1621 are opened. Operation of the secondary motor 1603 draws air from the secondary intake 1609 (arrow A) through exhaust 1611 (arrow B) through the filter material 1613 and dirt chamber 1615 to the secondary exhaust 1621 (arrow C). Given the limited task of the secondary suction device 1607, the suction device 1607 can be substantially smaller than the primary suction devices.

Alternatively, the motor 15 could be reversed to draw air through the primary exhaust 1617, close the intake 1619 and expel dirt through the secondary exhaust 1621.

Figure 18:
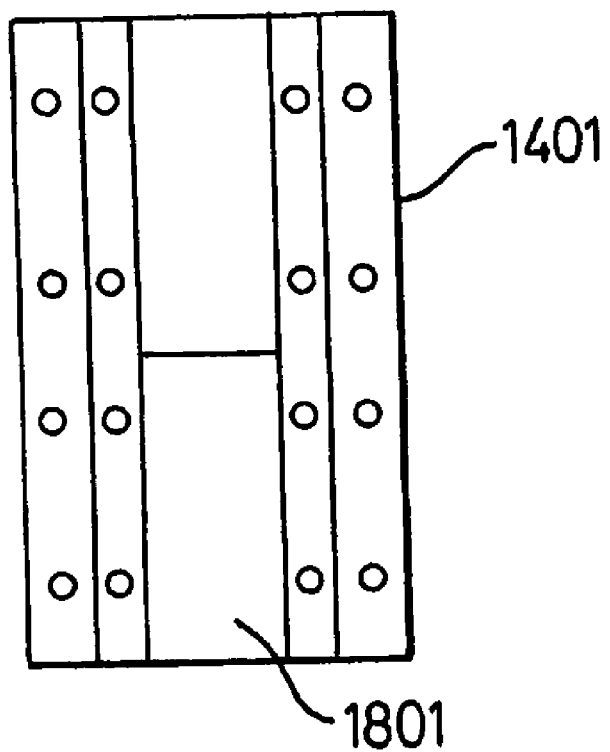
FIG. 18 is a front view of the suction device of FIG. 14 with an access door.

Referring to FIG. 18, as a further alternative, an access door 1801 could be provided to the filtration material and/or the dirt chamber for manual cleaning.

Figure 19:
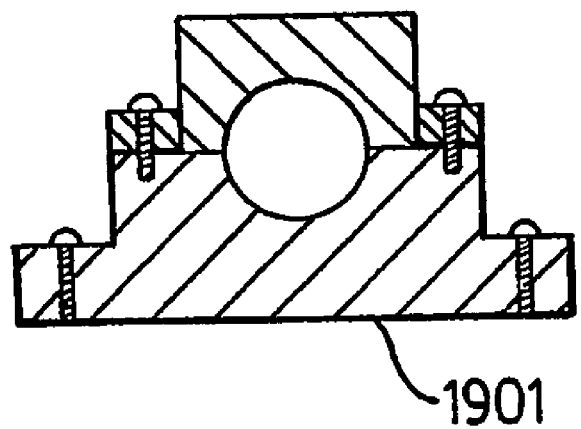
FIG. 19 is a top view cross-section of an alternative external casing profile for the suction device of FIG. 14.

Referring to FIG. 19, casing 1901 simply illustrates that alternative external profiles may be used, for example a rectangular profiles.

Figure 20:
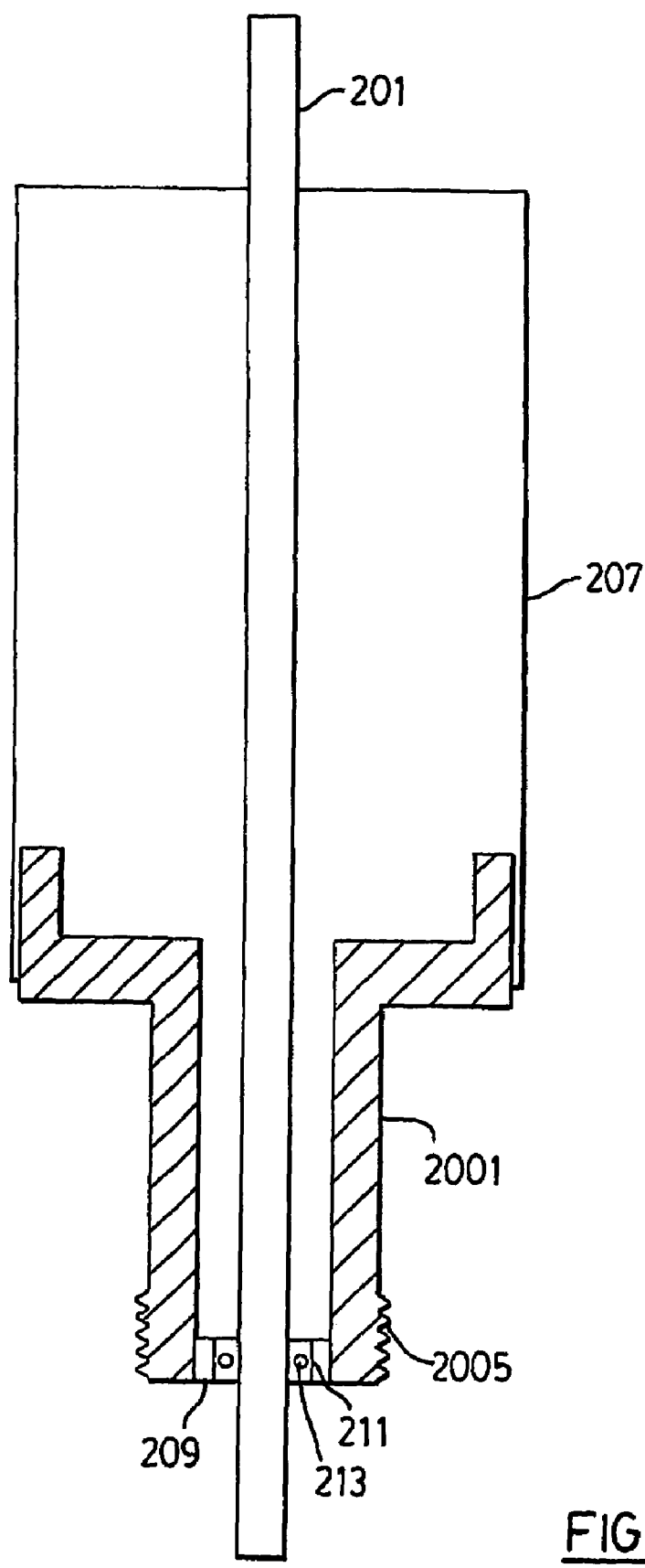
FIG. 20 is cross-section of a rotor with adapter embodiment of the present invention.

Referring to FIG. 20 and beyond, an adapter 2001 can be fitted to one end of the motor body 207. For this embodiment, like reference numerals from the previously described embodiments will be used for like parts. Except as otherwise set out or required in the transferring from one embodiment to another, parts of like reference numerals are similar and the description of those parts will not be repeated for each embodiment. Shaft 201 extends through the adapter 2001 and is held by circular caps 209 having a central cavity 211 into which are inserted ring bearings 213. As with earlier embodiments, this permits the body 207 (and the adapter 2001) to rotate about the shaft 201. The adapter 2001 may be integrally formed with the body 207 or it may be separately formed and attached by a suitable mounting method, such as corresponding threads on the adapter 2001 and the body 207, bolts, screws, welding, bayonet mount, or other technique. The adapter 2001 may be considered a part of the body 207 of reduced diameter.

Figure 21:
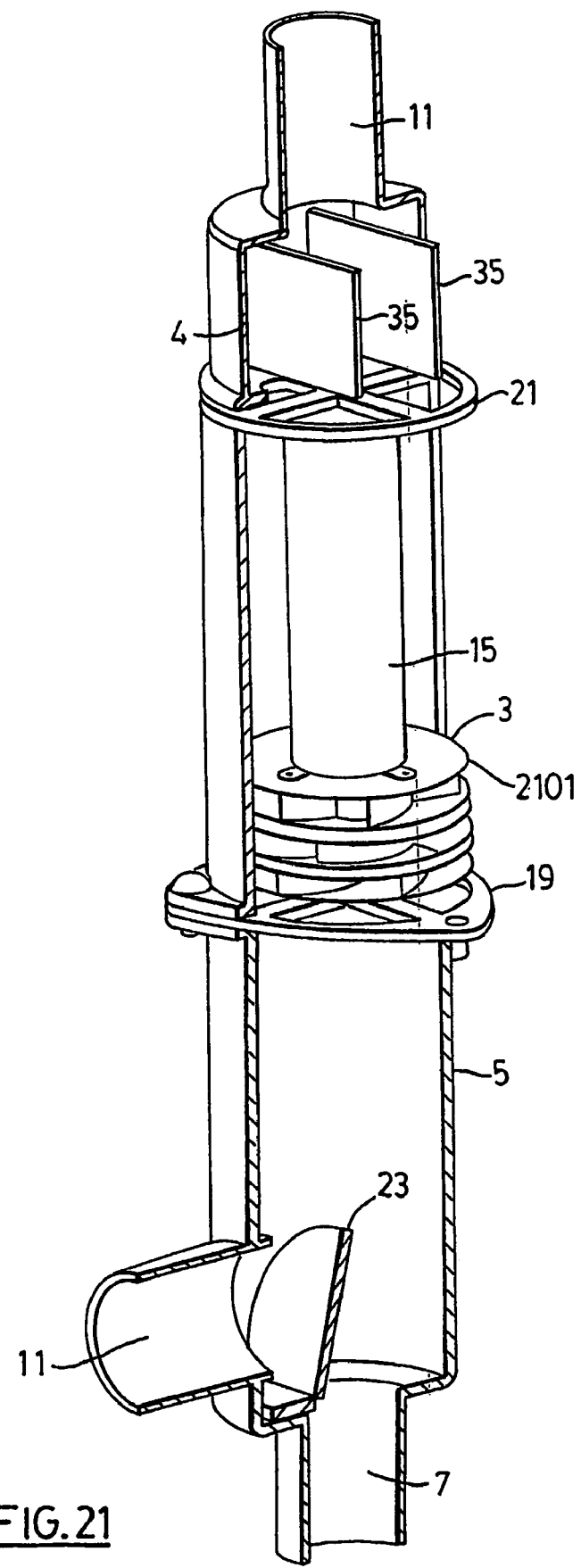
FIG. 21 is a perspective cut-away of the suction device of FIG. 1 utilizing the adapter of FIG. 20 in a centrifugal fan embodiment.
Figure 22:
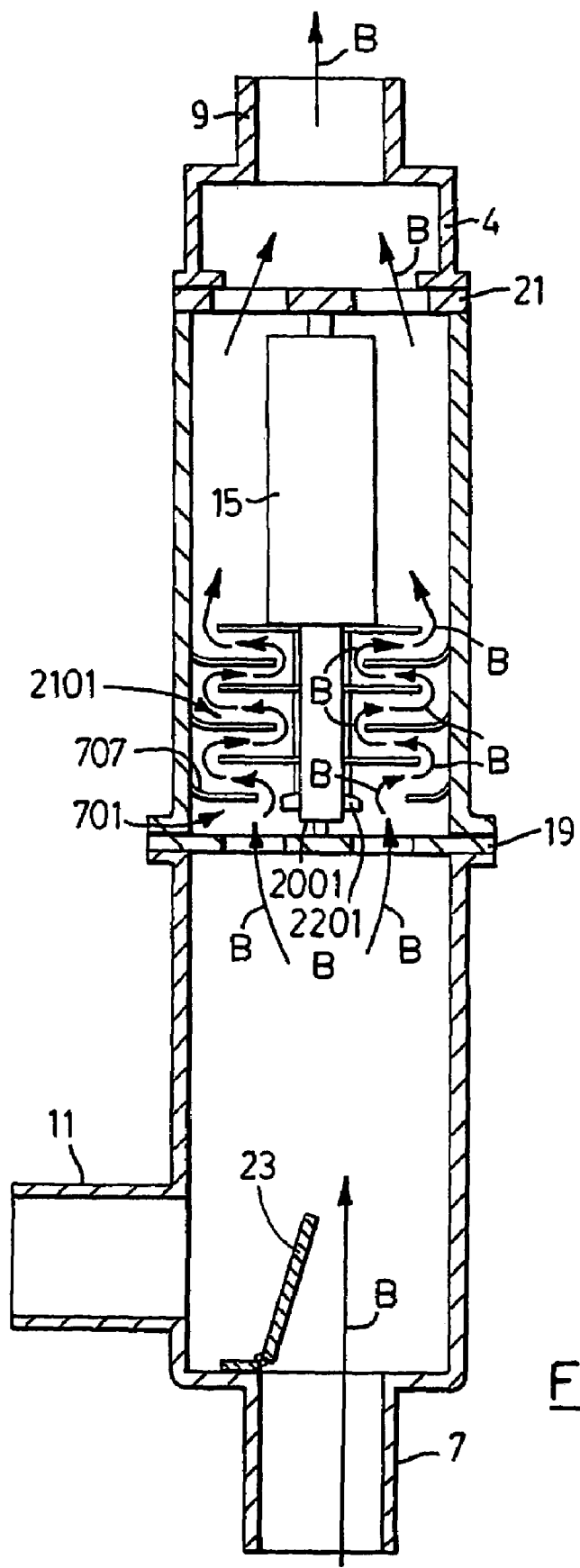
FIG. 22 is a cross-section of the suction device of FIG. 21.

Referring to FIGS. 21 and 22, a multi-stage centrifugal fan impeller 2101 can be mounted on the adapter 2001. It should be noted that the impeller blades (see FIGS. 21 and 23) have been removed in FIG. 22 for clarity. Components for such impeller 2101 are well known and can be easily adapted for use with the adapter 2001. Using the adapter 2001 it may be possible to avoid custom design of impeller 2101 for use with the suction device 1.

It may be necessary to lengthen the vacuum motor housing 3 to accommodate the new impeller 2101, it may also be necessary to have a housing of greater circumference.

Figure 23:
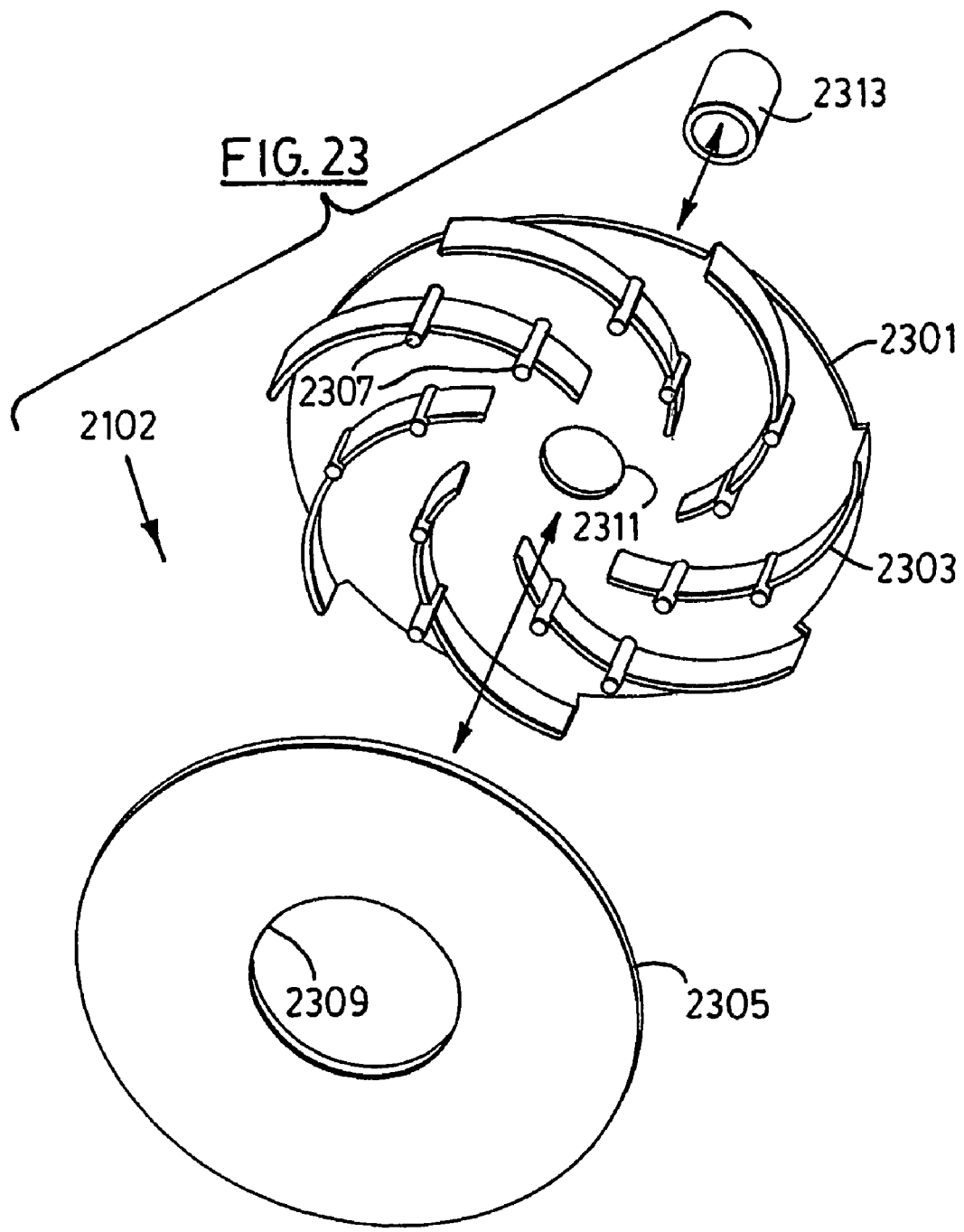
FIG. 23 is an exploded perspective view of a stage of the embodiment of FIG. 21.

Referring FIG. 23, an example centrifugal fan impeller stage 2102 comprises a first disk 2301 having centrifugal blades 2303 on one surface; A second disk 2305 is attached to the first disk, such that the blades 2303 are sandwiched between the first disk 2301 and second disk 2505. The blades 2303 may be integrally formed on the first disk 2301. The first disk 2303 may have pins 2307 extending beyond the blades 2303 to engage the second disk and prevent the disks 2301, 2305 from rotating with respect to one another. The pins 2307 may extend through the second disk 2305 and be attached by welding or riveting (for example if the material is plastic, the pins 2307 could be simply melted to rivet the disks 2301, 2305 to one another.

In use, the stage 2102 is rotated such that air is drawn in through opening 2309 in disk 2305. The blades 2303 create a vacuum that draws the stage and out the periphery of the stage 2102. Opening 2311 is sealed by the adapter 2001. The disk 2303 has a slightly smaller diameter than the disk 2305. This prevents air from being sucked around disk 2305, while allowing air to be expelled around the periphery of disk 2303.

If multiple stages 2102 are used, there must be a space for air return between stages. Thus, a spacer, such as spacer 2313 may be used. The spacer must be have a smaller diameter than the opening 2309 to ensure it does not block air flow into the stage.

Referring again to FIGS. 20 and 22, the impeller 2101 is held in fixed rotation with the body 207. The adapter 2001 has external threads 2005. The impeller 2101 is placed on the adapter 2001 and a nut 2201 is threaded on to threads 2005 to force the impeller against the body 207. A friction fit between impeller stages 2102 is typically sufficient; however, many other means could be used to mount and hold the impellers in place, such as bolts, screws, retaining rings, locking tabs and the like.

The operation of suction device 1 with adapter 2001 and impeller 2101 is otherwise similar to the embodiments previously described.

Figure 24:
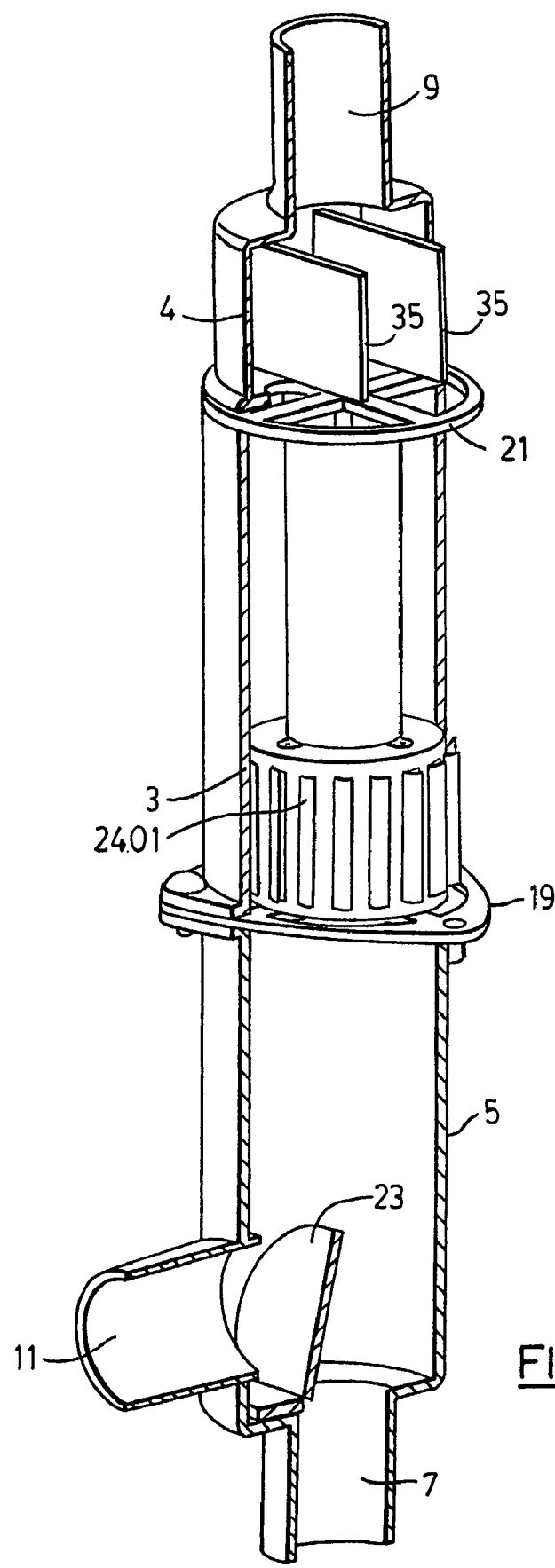
FIG. 24 is a perspective cut-away of the suction device of FIG. 1 utilizing the adapter of FIG. 20 in a squirrel cage fan embodiment.
Figure 25:
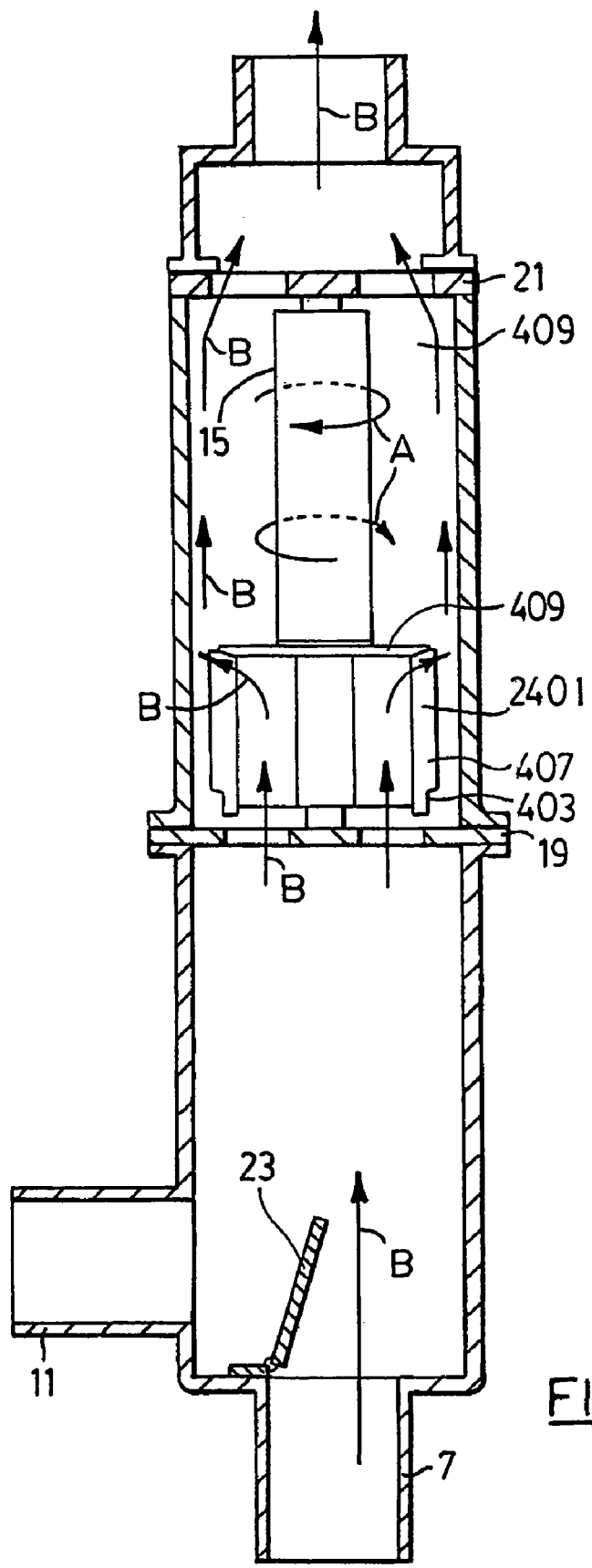
FIG. 25 is a cross-section of the suction device of FIG. 24.

Referring to FIGS. 24 and 25, a squirrel cage fan impeller 2401 embodiment for use with adapter 2001 is shown. The structural and operation of the impeller 2401 embodiment is evident from the description of the descriptions of the previous embodiments, in particular the embodiments of FIGS. 6 and 7 when read in conjunction with the description of FIGS. 20 through 22.

Figure 26:
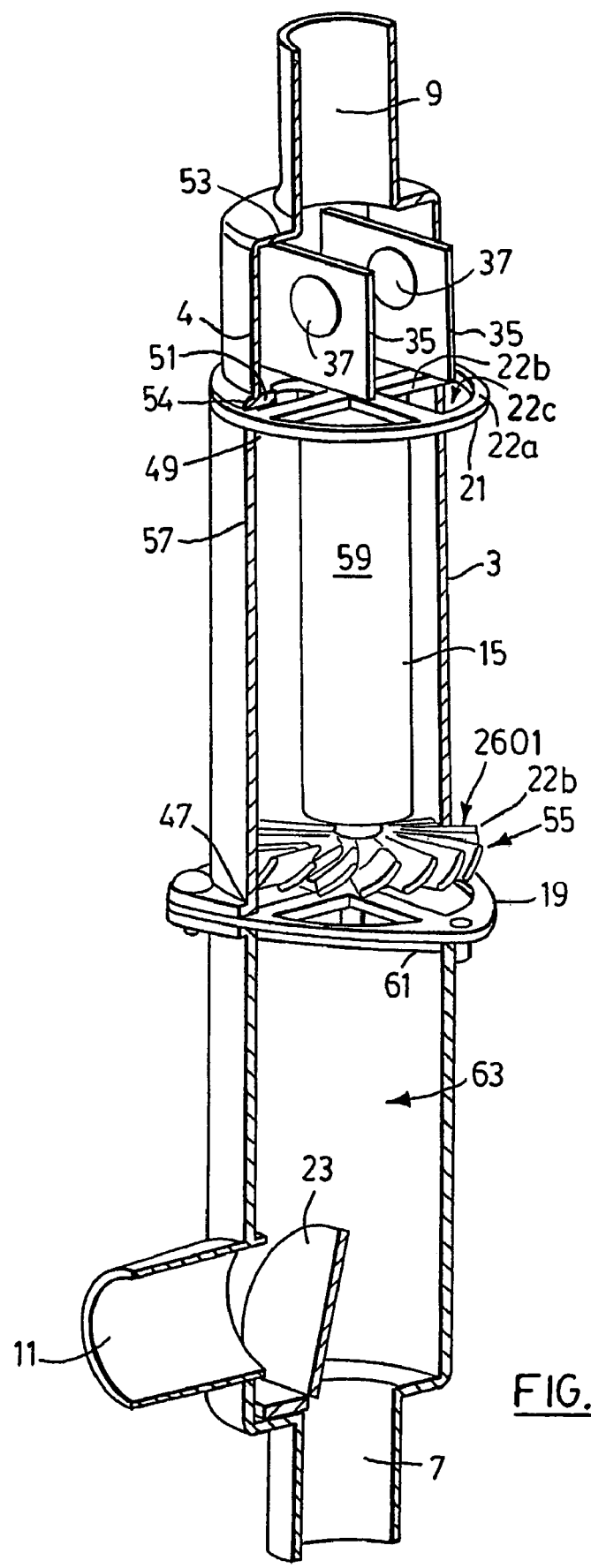
FIG. 26 is a perspective cut-away of the suction device of FIG. 1 utilizing the adapter of FIG. 20 in a fan blade embodiment.
Figure 27:
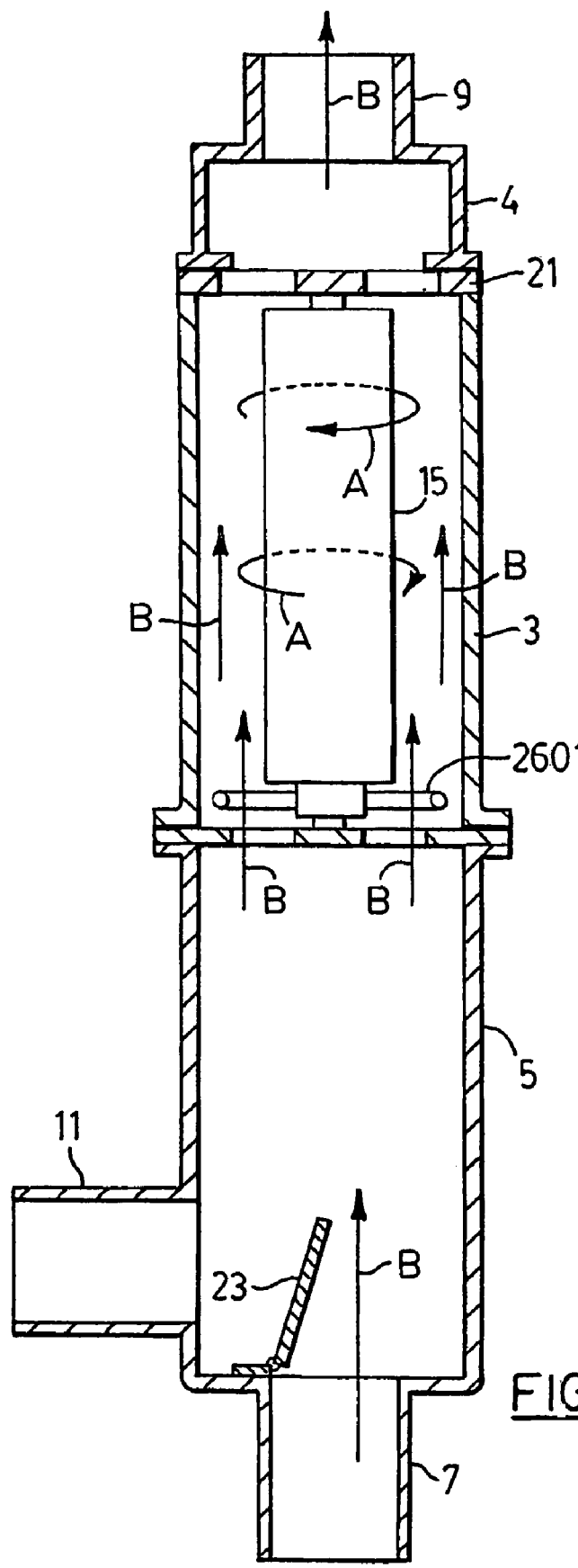
FIG. 27 is a cross-section of the suction device of FIG. 26.

Similarly, referring to FIGS. 26 and 27, fan blade impeller 2601 embodiment for use with adapter 2001 is shown. The structural and operation of the impeller 2601 embodiment is evident from the description of the descriptions of the previous embodiments, in particular the embodiments of FIG. 3 when read in conjunction with the description of FIGS. 20 through 22. A multiple stage fan blade impeller has not been shown; however, its structure and operation is evident from the description of the previous embodiments, in particular the embodiments of FIG. 10 when read in light of the description of FIGS. 20 through 22 and FIGS. 26 and 27.

The impellers 2001 and 2401 are best mounted on the intake side of the motor 15 in order to reduce blockage of intake air to the impeller 2001, 2401, and to take advantage of the impellers 2001, 2401 expelling air at their periphery where it will not be blocked by the motor 15.

As with other embodiments, the casings 2, 1401 or 1901 can be adapted to provide channeling of the air flow within and between stages of the impellers described herein.

It will be understood by those skilled in the art that this description is made with reference to the preferred embodiment and that it is possible to make other embodiments employing the principles of the invention which fall within its spirit and scope as defined by the following claims.

As an example, the suction device 1 has been described generally with application to central vacuuming systems. The device 1 is equally applicable to upright vacuum cleaner applications for moving air through an upright vacuum cleaner. As such applications are portable, a designer may not wish to use the "empty mode" features, and may wish to use a traditional vacuum cleaner bag in the dirt chamber to capture the dirt. Access would then have to be provided for the user to the bag as is known in the art.

Similarly, the "empty mode" features are not required for central vacuum system applications. A traditional removable canister could be used for a portion of the dirt chamber 5 with an intake 7 and door 23 on the tubular portion of the dirt chamber 5 above the removable canister.

Even where a removable canister is not used, the intake 7 and door 23 could be placed on the tubular portion of the dirt chamber 5. This may prevent dirt from fouling the operation of the door 23. This may require extra care to ensure that the door 23 remains shut during "empty mode".

What is claimed is:

1. A suction device for use in a cleaning apparatus that moves air, the device comprising:
   a. a casing defining a substantially cylindrical cavity, the casing having first and second opposing ends and a first axis, the first end having an intake, and the second end having an exhaust,
   b. a DC brushless motor contained within the cavity, the motor having a stator mounted to a shaft and the motor having a substantially cylindrical rotor mounted for rotation about the shaft, the shaft having a second axis and the shaft being mounted within the casing so as to be non-rotatable with respect to the casing with the first and second axes aligned, and
   c. an impeller mounted to the rotor so as to rotate with the rotor, wherein rotation of the impeller in a first direction causes air to be drawn through the intake and expelled through the exhaust, wherein the impeller is mounted about a reduced diameter portion of the rotor.

2. The suction device of claim 1, wherein the reduced diameter portion is an adaptor that is mounted at one end of the rotor.

3. The suction device of claim 2, wherein the one end of the rotor at which the adapter is mounted is closer to the intake than the other end of the rotor.

4. The suction device of claim 1, wherein the impeller comprises a centrifugal fan.

5. The suction device of claim 1, wherein the impeller comprises a multi-stage centrifugal fan.

6. The suction device of claim 1, wherein the casing has a diameter less than the depth of a wall stud of a conventionally framed structure.

7. The suction device of claim 1, wherein the casing has a diameter of 5 and ½ inches or less.

8. The suction device of claim 1, wherein the casing has a diameter of 3 and ½ inches or less.

9. The device of claim 1, wherein the impeller is a set of fan blades substantially spaced equally about the rotor in an arc perpendicular to the first and second axes.

10. The device of claim 1, wherein the impeller is a plurality of sets of fan blades, each set of fan blades substantially spaced equally about the rotor in an arc perpendicular to the first and second axes, the sets positioned from one another along the first and second axes.

11. The device of claim 1, wherein the impeller is a plurality of centrifugal fans.

12. The device of claim 1, wherein the impeller is a squirrel cage fan.

13. A cleaning system comprising an upright vacuum cleaner with the suction device of claim 1 as a means for moving air through the cleaner.

14. A central vacuum cleaning system comprising the suction device of claim 1 and an air delivery apparatus, and air connection is provided between the intake and the air delivery apparatus.

15. The system of claim 14, further comprising a filter between the intake and the air delivery apparatus, wherein the filter prevents particles from entering the intake.

16. The system of claim 15, further comprising a particle receptacle between the filter and the air delivery apparatus, wherein a substantial portion of the particles are released into the receptacle from the air entering the intake before the air reaches the filter.

17. A central vacuum cleaning system comprising the suction device of claim 1 and an air delivery apparatus, and air connection is provided between the intake and the air delivery apparatus, the system further comprising a first valve between the filter and the air delivery apparatus and a secondary exhaust between the filter and the first valve, the first valve having an open position to prevent air from passing through the first valve toward the air delivery apparatus and a closed position to permit air to pass through the first valve from the air delivery apparatus, the secondary exhaust for exhausting trapped particles from the filter when the first valve is closed.

18. The system of claim 17, wherein the rotation of the impeller in a second direction causes air to be drawn from the exhaust and to be exhausted through the secondary exhaust.

19. The system of claim 18, wherein closing of the first valve and opening of the secondary exhaust causes air drawn from the exhaust to be exhausted through the secondary exhaust.

20. The system of claim 17, wherein the impeller is mounted between the rotor and the casing.

21. The system of claim 17, wherein the impeller is mounted about a reduced diameter portion of the rotor.

22. The system of claim 17, wherein the rotor has an adaptor extending from one end, and the adaptor has a reduced diameter from the remainder of the rotor.

23. A suction device for use in a cleaning apparatus that moves air, the device comprising:
   a. a casing defining a substantially cylindrical cavity, the casing having first and second opposing ends and a first axis, the first end having an intake, and the second end having an exhaust,
   b. a DC brushless motor contained within the cavity, the motor having a stator mounted to a shaft and the motor having a substantially cylindrical rotor mounted for rotation about the shaft, the shaft having a second axis and the shaft being mounted within the casing so as to be non-rotatable with respect to the casing with the first and second axes aligned, and
   c. an impeller mounted to the rotor so as to rotate with the rotor, wherein rotation of the impeller in a first direction causes air to be drawn through the intake and expelled through the exhaust, wherein the rotor has an adaptor extending from one end, and the adaptor has a reduced diameter from the remainder of the rotor and the impeller is mounted about the reduced diameter portion.

24. A central vacuum cleaning system comprising:
a suction device for use in a cleaning apparatus that moves air, the device comprising:
   a. a casing defining a substantially cylindrical cavity, the casing having first and second opposing ends and a first axis, the first end having an intake, and the second end having an exhaust,
   b. a DC brushless motor contained within the cavity, the motor having a stator mounted to a shaft and the motor having a substantially cylindrical rotor mounted for rotation about the shaft, the shaft having a second axis and the shaft being mounted within the casing so as to be non-rotatable with respect to the casing with the first and second axes aligned, and
   c. an impeller mounted to the rotor so as to rotate with the rotor, wherein rotation of the impeller in a first direction causes air to be drawn through the intake and expelled through the exhaust, wherein the impeller is mounted about a reduced diameter portion of the rotor,
the system further comprising an air delivery apparatus, wherein the casing has a diameter less than the depth of a wall stud of a conventionally framed structure, and the device is mounted within a wall cavity between wall studs of a conventionally framed house, and air connection is provided between the intake and the air delivery apparatus,
the system further comprising a filter between the intake and the air delivery apparatus, wherein the filter prevents particles from entering the intake,
system further comprising a particle receptacle between the filter and the air delivery apparatus, wherein a substantial portion of the particles are released into the receptacle from the air entering the intake before the air reaches the filter, and
the system further comprising a first valve between the filter and the air delivery apparatus and a secondary exhaust between the filter and the first valve, the first valve having an open position to prevent air from passing through the first valve toward the air delivery apparatus and a closed position to permit air to pass through the first valve from the air delivery apparatus, the secondary exhaust for exhausting trapped particles from the filter when the first valve is closed.

25. The system of claim 24, wherein the rotation of the impeller in a second direction causes air to be drawn from the exhaust and to be exhausted through the secondary exhaust.

26. The system of claim 25, wherein closing of the first valve and opening of the secondary exhaust causes air drawn from the exhaust to be exhausted through the secondary exhaust.

* * * * *